United States Patent
Henia

(10) Patent No.: US 9,420,542 B2
(45) Date of Patent: Aug. 16, 2016

(54) SYSTEM-WIDE UPLINK BAND GAIN CONTROL IN A DISTRIBUTED ANTENNA SYSTEM (DAS), BASED ON PER BAND GAIN CONTROL OF REMOTE UPLINK PATHS IN REMOTE UNITS

(71) Applicant: CORNING OPTICAL COMMUNICATIONS WIRELESS LTD, Airport (IL)

(72) Inventor: Yoni Henia, Mazkeret Barya (IL)

(73) Assignee: Corning Optical Communications Wireless Ltd, Airport (IL)

( * ) Notice: Subject to any disclaimer, the term of this patent is extended or adjusted under 35 U.S.C. 154(b) by 28 days.

(21) Appl. No.: 14/496,410

(22) Filed: Sep. 25, 2014

(65) Prior Publication Data

US 2016/0095068 A1 Mar. 31, 2016

(51) Int. Cl.
| | |
|---|---|
| *H04W 52/14* | (2009.01) |
| *H04B 1/04* | (2006.01) |
| *H04B 17/13* | (2015.01) |
| *H04B 10/2575* | (2013.01) |

(52) U.S. Cl.
CPC .............. *H04W 52/146* (2013.01); *H04B 1/04* (2013.01); *H04B 10/25753* (2013.01); *H04B 17/13* (2015.01)

(58) Field of Classification Search
CPC ................................................ H04B 10/25753
USPC ........................ 455/500, 507, 522, 561, 562.1
See application file for complete search history.

(56) References Cited

U.S. PATENT DOCUMENTS

| | | |
|---|---|---|
| 4,365,865 A | 12/1982 | Stiles |
| 4,449,246 A | 5/1984 | Seiler et al. |
| 4,573,212 A | 2/1986 | Lipsky |
| 4,665,560 A | 5/1987 | Lange |
| 4,867,527 A | 9/1989 | Dotti et al. |
| 4,889,977 A | 12/1989 | Haydon |
| 4,896,939 A | 1/1990 | O'Brien |
| 4,916,460 A | 4/1990 | Powell |
| 4,939,852 A | 7/1990 | Brenner |

(Continued)

FOREIGN PATENT DOCUMENTS

| | | |
|---|---|---|
| AU | 645192 B | 10/1992 |
| AU | 731180 B2 | 3/1998 |

(Continued)

OTHER PUBLICATIONS

Seto et al., "Optical Subcarrier Multiplexing Transmission for Base Station With Adaptive Array Antenna," IEEE Transactions on Microwave Theory and Techniques, vol. 49, No. 10, Oct. 2001, pp. 2036-2041.

(Continued)

*Primary Examiner* — Nguyen Vo
(74) *Attorney, Agent, or Firm* — C. Keith Montgomery

(57) ABSTRACT

System-wide uplink band gain control in a distributed antenna system (DAS) based on per-band gain control of remote uplink paths in remote units is disclosed. In one embodiment, for each uplink band in the DAS, a gain control system receives remote uplink band power measurements for each remote uplink path for the uplink band. Based on these power measurements, the gain control system determines if the uplink gain of all of the remote uplink paths of the plurality of uplink paths of the uplink band should be adjusted. If the uplink gain of the remote uplink paths of the uplink band should be adjusted, the gain control system directs a remote uplink gain control circuit for each remote uplink path of the uplink band to adjust the uplink gain by a defined remote uplink band gain level.

20 Claims, 7 Drawing Sheets

(56) References Cited

U.S. PATENT DOCUMENTS

| | | |
|---|---|---|
| 4,972,346 A | 11/1990 | Kawano et al. |
| 5,039,195 A | 8/1991 | Jenkins et al. |
| 5,042,086 A | 8/1991 | Cole et al. |
| 5,056,109 A | 10/1991 | Gilhousen et al. |
| 5,059,927 A | 10/1991 | Cohen |
| 5,125,060 A | 6/1992 | Edmundson |
| 5,187,803 A | 2/1993 | Sohner et al. |
| 5,189,718 A | 2/1993 | Barrett et al. |
| 5,189,719 A | 2/1993 | Coleman et al. |
| 5,206,655 A | 4/1993 | Caille et al. |
| 5,208,812 A | 5/1993 | Dudek et al. |
| 5,210,812 A | 5/1993 | Nilsson et al. |
| 5,260,957 A | 11/1993 | Hakimi |
| 5,263,108 A | 11/1993 | Kurokawa et al. |
| 5,267,122 A | 11/1993 | Glover et al. |
| 5,268,971 A | 12/1993 | Nilsson et al. |
| 5,278,690 A | 1/1994 | Vella-Coleiro |
| 5,278,989 A | 1/1994 | Burke et al. |
| 5,280,472 A | 1/1994 | Gilhousen et al. |
| 5,299,947 A | 4/1994 | Barnard |
| 5,301,056 A | 4/1994 | O'Neill |
| 5,325,223 A | 6/1994 | Bears |
| 5,339,058 A | 8/1994 | Lique |
| 5,339,184 A | 8/1994 | Tang |
| 5,343,320 A | 8/1994 | Anderson |
| 5,377,035 A | 12/1994 | Wang et al. |
| 5,379,455 A | 1/1995 | Koschek |
| 5,381,459 A | 1/1995 | Lappington |
| 5,396,224 A | 3/1995 | Dukes et al. |
| 5,400,391 A | 3/1995 | Emura et al. |
| 5,420,863 A | 5/1995 | Taketsugu et al. |
| 5,424,864 A | 6/1995 | Emura |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,519,830 A | 5/1996 | Opoczynski |
| 5,543,000 A | 8/1996 | Lique |
| 5,546,443 A | 8/1996 | Raith |
| 5,557,698 A | 9/1996 | Gareis et al. |
| 5,574,815 A | 11/1996 | Kneeland |
| 5,598,288 A | 1/1997 | Collar |
| 5,606,725 A | 2/1997 | Hart |
| 5,615,034 A | 3/1997 | Hori |
| 5,627,879 A | 5/1997 | Russell et al. |
| 5,640,678 A | 6/1997 | Ishikawa et al. |
| 5,642,405 A | 6/1997 | Fischer et al. |
| 5,644,622 A | 7/1997 | Russell et al. |
| 5,648,961 A | 7/1997 | Ebihara |
| 5,651,081 A | 7/1997 | Blew et al. |
| 5,657,374 A | 8/1997 | Russell et al. |
| 5,668,562 A | 9/1997 | Cutrer et al. |
| 5,677,974 A | 10/1997 | Elms et al. |
| 5,682,256 A | 10/1997 | Motley et al. |
| 5,694,232 A | 12/1997 | Parsay et al. |
| 5,703,602 A | 12/1997 | Casebolt |
| 5,708,681 A | 1/1998 | Malkemes et al. |
| 5,726,984 A | 3/1998 | Kubler et al. |
| 5,765,099 A | 6/1998 | Georges et al. |
| 5,774,789 A | 6/1998 | van der Kaay et al. |
| 5,790,536 A | 8/1998 | Mahany et al. |
| 5,790,606 A | 8/1998 | Dent |
| 5,793,772 A | 8/1998 | Burke et al. |
| 5,802,173 A | 9/1998 | Hamilton-Piercy et al. |
| 5,802,473 A | 9/1998 | Rutledge et al. |
| 5,805,975 A | 9/1998 | Green, Sr. et al. |
| 5,805,983 A | 9/1998 | Naidu et al. |
| 5,809,395 A | 9/1998 | Hamilton-Piercy et al. |
| 5,809,422 A | 9/1998 | Raleigh et al. |
| 5,809,431 A | 9/1998 | Bustamante et al. |
| 5,812,296 A | 9/1998 | Tarusawa et al. |
| 5,818,619 A | 10/1998 | Medved et al. |
| 5,818,883 A | 10/1998 | Smith et al. |
| 5,821,510 A | 10/1998 | Cohen et al. |
| 5,825,651 A | 10/1998 | Gupta et al. |
| 5,838,474 A | 11/1998 | Stilling |
| 5,839,052 A | 11/1998 | Dean et al. |
| 5,852,651 A | 12/1998 | Fischer et al. |
| 5,854,986 A | 12/1998 | Dorren et al. |
| 5,859,719 A | 1/1999 | Dentai et al. |
| 5,862,460 A | 1/1999 | Rich |
| 5,867,485 A | 2/1999 | Chambers et al. |
| 5,867,763 A | 2/1999 | Dean et al. |
| 5,881,200 A | 3/1999 | Burt |
| 5,883,882 A | 3/1999 | Schwartz |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,953,670 A | 9/1999 | Newson |
| 5,959,531 A | 9/1999 | Gallagher, III et al. |
| 5,960,344 A | 9/1999 | Mahany |
| 5,969,837 A | 10/1999 | Farber et al. |
| 5,983,070 A | 11/1999 | Georges et al. |
| 5,987,303 A | 11/1999 | Dutta et al. |
| 6,005,884 A | 12/1999 | Cook et al. |
| 6,006,069 A | 12/1999 | Langston et al. |
| 6,006,105 A | 12/1999 | Rostoker et al. |
| 6,011,980 A | 1/2000 | Nagano et al. |
| 6,014,546 A | 1/2000 | Georges et al. |
| 6,016,426 A | 1/2000 | Bodell |
| 6,023,625 A | 2/2000 | Myers, Jr. |
| 6,037,898 A | 3/2000 | Parish et al. |
| 6,061,161 A | 5/2000 | Yang et al. |
| 6,069,721 A | 5/2000 | Oh et al. |
| 6,088,381 A | 7/2000 | Myers, Jr. |
| 6,112,086 A | 8/2000 | Wala |
| 6,118,767 A | 9/2000 | Shen et al. |
| 6,122,529 A | 9/2000 | Sabat, Jr. et al. |
| 6,127,917 A | 10/2000 | Tuttle |
| 6,128,470 A | 10/2000 | Naidu et al. |
| 6,128,477 A | 10/2000 | Freed |
| 6,148,041 A | 11/2000 | Dent |
| 6,150,921 A | 11/2000 | Werb et al. |
| 6,157,810 A | 12/2000 | Georges et al. |
| 6,192,216 B1 | 2/2001 | Sabat, Jr. et al. |
| 6,194,968 B1 | 2/2001 | Winslow |
| 6,212,397 B1 | 4/2001 | Langston et al. |
| 6,222,503 B1 | 4/2001 | Gietema |
| 6,223,201 B1 | 4/2001 | Reznak |
| 6,232,870 B1 | 5/2001 | Garber et al. |
| 6,236,789 B1 | 5/2001 | Fitz |
| 6,236,863 B1 | 5/2001 | Waldroup et al. |
| 6,240,274 B1 | 5/2001 | Izadpanah |
| 6,246,500 B1 | 6/2001 | Ackerman |
| 6,268,946 B1 | 7/2001 | Larkin et al. |
| 6,275,990 B1 | 8/2001 | Dapper et al. |
| 6,279,158 B1 | 8/2001 | Geile et al. |
| 6,286,163 B1 | 9/2001 | Trimble |
| 6,292,673 B1 | 9/2001 | Maeda et al. |
| 6,295,451 B1 | 9/2001 | Mimura |
| 6,301,240 B1 | 10/2001 | Slabinski et al. |
| 6,307,869 B1 | 10/2001 | Pawelski |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,241 B1 | 12/2001 | Fort |
| 6,330,244 B1 | 12/2001 | Swartz et al. |
| 6,334,219 B1 | 12/2001 | Hill et al. |
| 6,336,021 B1 | 1/2002 | Nukada |
| 6,336,042 B1 | 1/2002 | Dawson et al. |
| 6,337,754 B1 | 1/2002 | Imajo |
| 6,340,932 B1 | 1/2002 | Rodgers et al. |
| 6,353,406 B1 | 3/2002 | Lanzl et al. |
| 6,353,600 B1 | 3/2002 | Schwartz et al. |
| 6,359,714 B1 | 3/2002 | Imajo |
| 6,370,203 B1 | 4/2002 | Boesch et al. |

(56) References Cited

U.S. PATENT DOCUMENTS

| | | |
|---|---|---|
| 6,374,078 B1 | 4/2002 | Williams et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,404,775 B1 | 6/2002 | Leslie et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,414,624 B2 | 7/2002 | Endo et al. |
| 6,415,132 B1 | 7/2002 | Sabat, Jr. |
| 6,421,327 B1 | 7/2002 | Lundby et al. |
| 6,438,301 B1 | 8/2002 | Johnson et al. |
| 6,438,371 B1 | 8/2002 | Fujise et al. |
| 6,448,558 B1 | 9/2002 | Greene |
| 6,452,915 B1 | 9/2002 | Jorgensen |
| 6,459,519 B1 | 10/2002 | Sasai et al. |
| 6,459,989 B1 | 10/2002 | Kirkpatrick et al. |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,965 B1 | 12/2002 | Lucidarme |
| 6,504,636 B1 | 1/2003 | Seto et al. |
| 6,504,831 B1 | 1/2003 | Greenwood et al. |
| 6,512,478 B1 | 1/2003 | Chien |
| 6,519,395 B1 | 2/2003 | Bevan et al. |
| 6,519,449 B1 | 2/2003 | Zhang et al. |
| 6,525,855 B1 | 2/2003 | Westbrook et al. |
| 6,535,330 B1 | 3/2003 | Lelic et al. |
| 6,535,720 B1 | 3/2003 | Kintis et al. |
| 6,556,551 B1 | 4/2003 | Schwartz |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,587,514 B1 | 7/2003 | Wright et al. |
| 6,594,496 B2 | 7/2003 | Schwartz |
| 6,597,325 B2 | 7/2003 | Judd et al. |
| 6,598,009 B2 | 7/2003 | Yang |
| 6,606,430 B2 | 8/2003 | Bartur et al. |
| 6,615,074 B2 | 9/2003 | Mickle et al. |
| 6,628,732 B1 | 9/2003 | Takaki |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,590 B2 | 11/2003 | Boros et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,674,966 B1 | 1/2004 | Koonen |
| 6,675,294 B1 | 1/2004 | Gupta et al. |
| 6,678,509 B2 | 1/2004 | Skarman et al. |
| 6,687,437 B1 | 2/2004 | Starnes et al. |
| 6,690,328 B2 | 2/2004 | Judd |
| 6,697,603 B1 | 2/2004 | Lovinggood et al. |
| 6,701,137 B1 | 3/2004 | Judd et al. |
| 6,704,298 B1 | 3/2004 | Matsumiya et al. |
| 6,704,545 B1 | 3/2004 | Wala |
| 6,710,366 B1 | 3/2004 | Lee et al. |
| 6,714,800 B2 | 3/2004 | Johnson et al. |
| 6,731,880 B2 | 5/2004 | Westbrook et al. |
| 6,745,013 B1 | 6/2004 | Porter et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,823,174 B1 | 11/2004 | Masenten et al. |
| 6,826,163 B2 | 11/2004 | Mani et al. |
| 6,826,164 B2 | 11/2004 | Mani et al. |
| 6,826,337 B2 | 11/2004 | Linnell |
| 6,836,660 B1 | 12/2004 | Wala |
| 6,836,673 B1 | 12/2004 | Trott |
| 6,842,433 B2 | 1/2005 | West et al. |
| 6,842,459 B1 | 1/2005 | Binder |
| 6,847,856 B1 | 1/2005 | Bohannon |
| 6,850,510 B2 | 2/2005 | Kubler |
| 6,865,390 B2 | 3/2005 | Goss et al. |
| 6,873,823 B2 | 3/2005 | Hasarchi |
| 6,876,056 B2 | 4/2005 | Tilmans et al. |
| 6,879,290 B1 | 4/2005 | Toutain et al. |
| 6,882,311 B2 | 4/2005 | Walker et al. |
| 6,883,710 B2 | 4/2005 | Chung |
| 6,885,344 B2 | 4/2005 | Mohamadi |
| 6,885,846 B1 | 4/2005 | Panasik et al. |
| 6,889,060 B2 | 5/2005 | Fernando et al. |
| 6,909,399 B1 | 6/2005 | Zegelin et al. |
| 6,915,058 B2 | 7/2005 | Pons |
| 6,915,529 B1 | 7/2005 | Suematsu et al. |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,931,659 B1 | 8/2005 | Kinemura |
| 6,933,849 B2 | 8/2005 | Sawyer |
| 6,934,511 B1 | 8/2005 | Lovinggood et al. |
| 6,934,541 B2 | 8/2005 | Miyatani |
| 6,941,112 B2 | 9/2005 | Hasegawa |
| 6,946,989 B2 | 9/2005 | Vavik |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,967,347 B2 | 11/2005 | Estes et al. |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 6,977,502 B1 | 12/2005 | Hertz |
| 7,002,511 B1 | 2/2006 | Ammar et al. |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,020,473 B2 | 3/2006 | Splett |
| 7,020,488 B1 | 3/2006 | Bleile et al. |
| 7,024,166 B2 | 4/2006 | Wallace |
| 7,035,512 B2 | 4/2006 | Van Bijsterveld |
| 7,035,671 B2 | 4/2006 | Solum |
| 7,039,399 B2 | 5/2006 | Fischer |
| 7,043,271 B1 | 5/2006 | Seto et al. |
| 7,047,028 B2 | 5/2006 | Cagenius et al. |
| 7,050,017 B2 | 5/2006 | King et al. |
| 7,053,838 B2 | 5/2006 | Judd |
| 7,054,513 B2 | 5/2006 | Herz et al. |
| 7,069,577 B2 | 6/2006 | Geile et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,093,985 B2 | 8/2006 | Lord et al. |
| 7,103,119 B2 | 9/2006 | Matsuoka et al. |
| 7,103,377 B2 | 9/2006 | Bauman et al. |
| 7,106,252 B2 | 9/2006 | Smith et al. |
| 7,106,931 B2 | 9/2006 | Sutehall et al. |
| 7,110,795 B2 | 9/2006 | Doi |
| 7,114,859 B1 | 10/2006 | Tuohimaa et al. |
| 7,127,175 B2 | 10/2006 | Mani et al. |
| 7,127,176 B2 | 10/2006 | Sasaki |
| 7,142,503 B1 | 11/2006 | Grant et al. |
| 7,142,535 B2 | 11/2006 | Kubler et al. |
| 7,142,619 B2 | 11/2006 | Sommer et al. |

(56) References Cited

U.S. PATENT DOCUMENTS

| | | |
|---|---|---|
| 7,146,506 B1 | 12/2006 | Hannah et al. |
| 7,160,032 B2 | 1/2007 | Nagashima et al. |
| 7,171,244 B2 | 1/2007 | Bauman |
| 7,184,728 B2 | 2/2007 | Solum |
| 7,190,748 B2 | 3/2007 | Kim et al. |
| 7,194,023 B2 | 3/2007 | Norrell et al. |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,263,293 B2 | 8/2007 | Ommodt et al. |
| 7,269,311 B2 | 9/2007 | Kim et al. |
| 7,280,011 B2 | 10/2007 | Bayar et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,348,843 B1 | 3/2008 | Qiu et al. |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,388,892 B2 | 6/2008 | Nishiyama et al. |
| 7,392,025 B2 | 6/2008 | Rooyen et al. |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,424,228 B1 | 9/2008 | Williams et al. |
| 7,442,679 B2 | 10/2008 | Stolte et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,454,222 B2 | 11/2008 | Huang et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,483,711 B2 | 1/2009 | Burchfiel |
| 7,496,070 B2 | 2/2009 | Vesuna |
| 7,496,384 B2 | 2/2009 | Seto et al. |
| 7,505,747 B2 | 3/2009 | Solum |
| 7,512,419 B2 | 3/2009 | Solum |
| 7,522,552 B2 | 4/2009 | Fein et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,138 B2 | 6/2009 | Kamgaing |
| 7,548,695 B2 | 6/2009 | Wake |
| 7,551,641 B2 | 6/2009 | Pirzada et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,593,704 B2 | 9/2009 | Pinel et al. |
| 7,599,420 B2 | 10/2009 | Forenza et al. |
| 7,599,672 B2 | 10/2009 | Shoji et al. |
| 7,610,046 B2 | 10/2009 | Wala |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,565 B2 | 2/2010 | Ylänen et al. |
| 7,675,936 B2 | 3/2010 | Mizutani et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,697,574 B2 | 4/2010 | Suematsu et al. |
| 7,715,375 B2 | 5/2010 | Kubler et al. |
| 7,720,510 B2 | 5/2010 | Pescod et al. |
| 7,751,374 B2 | 7/2010 | Donovan |
| 7,751,838 B2 | 7/2010 | Ramesh et al. |
| 7,760,703 B2 | 7/2010 | Kubler et al. |
| 7,761,093 B2 | 7/2010 | Sabat, Jr. et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,787,823 B2 | 8/2010 | George et al. |
| 7,787,854 B2 | 8/2010 | Conyers et al. |
| 7,805,073 B2 | 9/2010 | Sabat, Jr. et al. |
| 7,809,012 B2 | 10/2010 | Ruuska et al. |
| 7,812,766 B2 | 10/2010 | Leblanc et al. |
| 7,812,775 B2 | 10/2010 | Babakhani et al. |
| 7,817,958 B2 | 10/2010 | Scheinert et al. |
| 7,817,969 B2 | 10/2010 | Castaneda et al. |
| 7,835,328 B2 | 11/2010 | Stephens et al. |
| 7,844,273 B2 | 11/2010 | Scheinert |
| 7,848,316 B2 | 12/2010 | Kubler et al. |
| 7,848,731 B1 | 12/2010 | Dianda et al. |
| 7,848,770 B2 | 12/2010 | Scheinert |
| 7,853,234 B2 | 12/2010 | Afsahi |
| 7,870,321 B2 | 1/2011 | Rofougaran |
| 7,880,677 B2 | 2/2011 | Rofougaran et al. |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,912,506 B2 | 3/2011 | Lovberg et al. |
| 7,916,706 B2 | 3/2011 | Kubler et al. |
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,929,940 B1 | 4/2011 | Dianda et al. |
| 7,936,713 B2 | 5/2011 | Kubler et al. |
| 7,948,897 B2 | 5/2011 | Stuart et al. |
| 7,949,364 B2 | 5/2011 | Kasslin et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,990,925 B2 | 8/2011 | Tinnakornsrisuphap et al. |
| 7,996,020 B1 | 8/2011 | Chhabra |
| 8,018,907 B2 | 9/2011 | Kubler et al. |
| 8,023,886 B2 | 9/2011 | Rofougaran |
| 8,027,656 B2 | 9/2011 | Rofougaran et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 8,107,464 B2 | 1/2012 | Schmidt et al. |
| 8,135,102 B2 | 3/2012 | Wiwel et al. |
| 8,174,428 B2 | 5/2012 | Wegener |
| 8,213,401 B2 | 7/2012 | Fischer et al. |
| 8,223,795 B2 | 7/2012 | Cox et al. |
| 8,238,463 B1 | 8/2012 | Arslan et al. |
| 8,270,387 B2 | 9/2012 | Cannon et al. |
| 8,274,929 B2 | 9/2012 | Schmidt et al. |
| 8,279,800 B2 | 10/2012 | Schmidt et al. |
| 8,290,483 B2 | 10/2012 | Sabat, Jr. et al. |
| 8,306,563 B2 | 11/2012 | Zavadsky et al. |
| 8,346,091 B2 | 1/2013 | Kummetz et al. |
| 8,346,278 B2 | 1/2013 | Wala et al. |
| 8,422,884 B2 | 4/2013 | Mao |
| 8,428,201 B1 | 4/2013 | McHann, Jr. et al. |
| 8,428,510 B2 | 4/2013 | Stratford et al. |
| 8,462,683 B2 | 6/2013 | Uyehara et al. |
| 8,467,823 B2 | 6/2013 | Seki et al. |
| 8,472,579 B2 | 6/2013 | Uyehara et al. |
| 8,509,215 B2 | 8/2013 | Stuart |

(56) References Cited

U.S. PATENT DOCUMENTS

| | | |
|---|---|---|
| 8,509,850 B2 | 8/2013 | Zavadsky et al. |
| 8,526,970 B2 | 9/2013 | Wala et al. |
| 8,532,242 B2 | 9/2013 | Fischer et al. |
| 8,548,526 B2 | 10/2013 | Schmidt et al. |
| 8,583,100 B2 | 11/2013 | Koziy et al. |
| 8,626,245 B2 | 1/2014 | Zavadsky et al. |
| 8,634,766 B2 | 1/2014 | Hobbs et al. |
| 8,681,917 B2 | 3/2014 | McAllister et al. |
| 8,693,342 B2 | 4/2014 | Uyehara et al. |
| 8,694,034 B2 | 4/2014 | Notargiacomo |
| 8,699,982 B2 | 4/2014 | Singh |
| 8,737,300 B2 | 5/2014 | Stapleton et al. |
| 8,737,454 B2 | 5/2014 | Wala et al. |
| 8,743,718 B2 | 6/2014 | Grenier et al. |
| 8,743,756 B2 | 6/2014 | Uyehara et al. |
| 8,792,933 B2 | 7/2014 | Chen |
| 8,837,659 B2 | 9/2014 | Uyehara et al. |
| 8,837,940 B2 | 9/2014 | Smith et al. |
| 8,873,585 B2 | 10/2014 | Oren et al. |
| 8,908,607 B2 | 12/2014 | Kummetz et al. |
| 8,929,288 B2 | 1/2015 | Stewart et al. |
| 8,948,816 B2 | 2/2015 | Fischer et al. |
| 8,958,789 B2 | 2/2015 | Bauman et al. |
| 8,976,067 B2 | 3/2015 | Fisdcher |
| 9,001,811 B2 | 4/2015 | Wala et al. |
| 2001/0036163 A1 | 11/2001 | Sabat, Jr. et al. |
| 2001/0036199 A1 | 11/2001 | Terry |
| 2002/0003645 A1 | 1/2002 | Kim et al. |
| 2002/0009070 A1 | 1/2002 | Lindsay et al. |
| 2002/0012336 A1 | 1/2002 | Hughes et al. |
| 2002/0012495 A1 | 1/2002 | Sasai et al. |
| 2002/0016827 A1 | 2/2002 | McCabe et al. |
| 2002/0045519 A1 | 4/2002 | Watterson et al. |
| 2002/0048071 A1 | 4/2002 | Suzuki et al. |
| 2002/0051434 A1 | 5/2002 | Ozluturk et al. |
| 2002/0075906 A1 | 6/2002 | Cole et al. |
| 2002/0092347 A1 | 7/2002 | Niekerk et al. |
| 2002/0097564 A1 | 7/2002 | Struhsaker et al. |
| 2002/0103012 A1 | 8/2002 | Kim et al. |
| 2002/0111149 A1 | 8/2002 | Shoki |
| 2002/0111192 A1 | 8/2002 | Thomas et al. |
| 2002/0114038 A1 | 8/2002 | Arnon et al. |
| 2002/0123365 A1 | 9/2002 | Thorson et al. |
| 2002/0126967 A1 | 9/2002 | Panak et al. |
| 2002/0128009 A1 | 9/2002 | Boch et al. |
| 2002/0130778 A1 | 9/2002 | Nicholson |
| 2002/0181668 A1 | 12/2002 | Masoian et al. |
| 2002/0190845 A1 | 12/2002 | Moore |
| 2002/0197984 A1 | 12/2002 | Monin et al. |
| 2003/0002604 A1 | 1/2003 | Fifield et al. |
| 2003/0007214 A1 | 1/2003 | Aburakawa et al. |
| 2003/0016418 A1 | 1/2003 | Westbrook et al. |
| 2003/0045284 A1 | 3/2003 | Copley et al. |
| 2003/0069922 A1 | 4/2003 | Arunachalam |
| 2003/0078074 A1 | 4/2003 | Sesay et al. |
| 2003/0112826 A1 | 6/2003 | Ashwood Smith et al. |
| 2003/0141962 A1 | 7/2003 | Barink |
| 2003/0161637 A1 | 8/2003 | Yamamoto et al. |
| 2003/0162516 A1 | 8/2003 | Solum |
| 2003/0165287 A1 | 9/2003 | Krill et al. |
| 2003/0174099 A1 | 9/2003 | Bauer et al. |
| 2003/0209601 A1 | 11/2003 | Chung |
| 2004/0001719 A1 | 1/2004 | Sasaki |
| 2004/0008114 A1 | 1/2004 | Sawyer |
| 2004/0017785 A1 | 1/2004 | Zelst |
| 2004/0037565 A1 | 2/2004 | Young et al. |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0078151 A1 | 4/2004 | Aljadeff et al. |
| 2004/0095907 A1 | 5/2004 | Agee et al. |
| 2004/0100930 A1 | 5/2004 | Shapira et al. |
| 2004/0105435 A1 | 6/2004 | Morioka |
| 2004/0106387 A1 | 6/2004 | Bauman et al. |
| 2004/0106435 A1 | 6/2004 | Bauman et al. |
| 2004/0126068 A1 | 7/2004 | Van Bijsterveld |
| 2004/0126107 A1 | 7/2004 | Jay et al. |
| 2004/0139477 A1 | 7/2004 | Russell et al. |
| 2004/0146020 A1 | 7/2004 | Kubler et al. |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162084 A1 | 8/2004 | Wang |
| 2004/0162115 A1 | 8/2004 | Smith et al. |
| 2004/0162116 A1 | 8/2004 | Han et al. |
| 2004/0165573 A1 | 8/2004 | Kubler et al. |
| 2004/0175173 A1 | 9/2004 | Deas |
| 2004/0196404 A1 | 10/2004 | Loheit et al. |
| 2004/0202257 A1 | 10/2004 | Mehta et al. |
| 2004/0203703 A1 | 10/2004 | Fischer |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0208643 A1 | 10/2004 | Roberts et al. |
| 2004/0215723 A1 | 10/2004 | Chadha |
| 2004/0218873 A1 | 11/2004 | Nagashima et al. |
| 2004/0233877 A1 | 11/2004 | Lee et al. |
| 2004/0258105 A1 | 12/2004 | Spathas et al. |
| 2004/0267971 A1 | 12/2004 | Seshadri |
| 2005/0052287 A1 | 3/2005 | Whitesmith et al. |
| 2005/0058451 A1 | 3/2005 | Ross |
| 2005/0068179 A1 | 3/2005 | Roesner |
| 2005/0076982 A1 | 4/2005 | Metcalf et al. |
| 2005/0078006 A1 | 4/2005 | Hutchins |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0123232 A1 | 6/2005 | Piede et al. |
| 2005/0141545 A1 | 6/2005 | Fein et al. |
| 2005/0143077 A1 | 6/2005 | Charbonneau |
| 2005/0147067 A1 | 7/2005 | Mani et al. |
| 2005/0147071 A1 | 7/2005 | Karaoguz et al. |
| 2005/0148306 A1 | 7/2005 | Hiddink |
| 2005/0159108 A1 | 7/2005 | Fletcher |
| 2005/0174236 A1 | 8/2005 | Brookner |
| 2005/0176458 A1 | 8/2005 | Shklarsky et al. |
| 2005/0201323 A1 | 9/2005 | Mani et al. |
| 2005/0201761 A1 | 9/2005 | Bartur et al. |
| 2005/0219050 A1 | 10/2005 | Martin |
| 2005/0224585 A1 | 10/2005 | Durrant et al. |
| 2005/0226625 A1 | 10/2005 | Wake et al. |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2005/0272439 A1 | 12/2005 | Picciriello et al. |
| 2006/0002326 A1 | 1/2006 | Vesuna |
| 2006/0014548 A1 | 1/2006 | Bolin |
| 2006/0017633 A1 | 1/2006 | Pronkine |
| 2006/0028352 A1 | 2/2006 | McNamara et al. |
| 2006/0045054 A1 | 3/2006 | Utsumi et al. |
| 2006/0045524 A1 | 3/2006 | Lee et al. |
| 2006/0045525 A1 | 3/2006 | Lee et al. |
| 2006/0053324 A1 | 3/2006 | Giat et al. |
| 2006/0056327 A1 | 3/2006 | Coersmeier |
| 2006/0062579 A1 | 3/2006 | Kim et al. |
| 2006/0083520 A1 | 4/2006 | Healey et al. |
| 2006/0094470 A1 | 5/2006 | Wake et al. |
| 2006/0104643 A1 | 5/2006 | Lee et al. |
| 2006/0159388 A1 | 7/2006 | Kawase et al. |
| 2006/0172775 A1 | 8/2006 | Conyers et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0209745 A1 | 9/2006 | MacMullan et al. |
| 2006/0223439 A1 | 10/2006 | Pinel et al. |
| 2006/0233506 A1 | 10/2006 | Noonan et al. |

(56) References Cited

U.S. PATENT DOCUMENTS

| | | |
|---|---|---|
| 2006/0239630 A1 | 10/2006 | Hase et al. |
| 2006/0268738 A1 | 11/2006 | Goerke et al. |
| 2006/0274704 A1 | 12/2006 | Desai et al. |
| 2007/0008939 A1 | 1/2007 | Fischer |
| 2007/0009266 A1 | 1/2007 | Bothwell |
| 2007/0050451 A1 | 3/2007 | Caspi et al. |
| 2007/0054682 A1 | 3/2007 | Fanning et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0149250 A1 | 6/2007 | Crozzoli et al. |
| 2007/0166042 A1 | 7/2007 | Seeds et al. |
| 2007/0173288 A1 | 7/2007 | Skarby et al. |
| 2007/0174889 A1 | 7/2007 | Kim et al. |
| 2007/0224954 A1 | 9/2007 | Gopi |
| 2007/0230328 A1 | 10/2007 | Saitou |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0257796 A1 | 11/2007 | Easton et al. |
| 2007/0264009 A1 | 11/2007 | Sabat, Jr. et al. |
| 2007/0264011 A1 | 11/2007 | Sone et al. |
| 2007/0268846 A1 | 11/2007 | Proctor et al. |
| 2007/0274279 A1 | 11/2007 | Wood et al. |
| 2007/0292143 A1 | 12/2007 | Yu et al. |
| 2007/0297005 A1 | 12/2007 | Montierth et al. |
| 2008/0002652 A1 | 1/2008 | Gupta et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0056167 A1 | 3/2008 | Kim et al. |
| 2008/0058018 A1 | 3/2008 | Scheinert |
| 2008/0063397 A1 | 3/2008 | Hu et al. |
| 2008/0070502 A1 | 3/2008 | George et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0166094 A1 | 7/2008 | Bookbinder et al. |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232305 A1 | 9/2008 | Oren et al. |
| 2008/0232799 A1 | 9/2008 | Kim |
| 2008/0247716 A1 | 10/2008 | Thomas |
| 2008/0253280 A1 | 10/2008 | Tang et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268766 A1 | 10/2008 | Narkmon et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310464 A1 | 12/2008 | Schneider |
| 2008/0310848 A1 | 12/2008 | Yasuda et al. |
| 2008/0311876 A1 | 12/2008 | Leenaerts et al. |
| 2008/0311944 A1 | 12/2008 | Hansen et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0073916 A1 | 3/2009 | Zhang et al. |
| 2009/0081985 A1 | 3/2009 | Rofougaran et al. |
| 2009/0087179 A1 | 4/2009 | Underwood et al. |
| 2009/0088071 A1 | 4/2009 | Rofougaran |
| 2009/0088072 A1 | 4/2009 | Rofougaran et al. |
| 2009/0135078 A1 | 5/2009 | Lindmark et al. |
| 2009/0141780 A1 | 6/2009 | Cruz-Albrecht et al. |
| 2009/0149221 A1 | 6/2009 | Liu et al. |
| 2009/0154621 A1 | 6/2009 | Shapira et al. |
| 2009/0169163 A1 | 7/2009 | Abbott, III et al. |
| 2009/0175214 A1 | 7/2009 | Sfar et al. |
| 2009/0180407 A1 | 7/2009 | Sabat et al. |
| 2009/0180426 A1 | 7/2009 | Sabat et al. |
| 2009/0218407 A1 | 9/2009 | Rofougaran |
| 2009/0218657 A1 | 9/2009 | Rofougaran |
| 2009/0237317 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0247109 A1 | 10/2009 | Rofougaran |
| 2009/0252136 A1 | 10/2009 | Mahany et al. |
| 2009/0252139 A1 | 10/2009 | Ludovico et al. |
| 2009/0252204 A1 | 10/2009 | Shatara et al. |
| 2009/0252205 A1 | 10/2009 | Rheinfelder et al. |
| 2009/0258652 A1 | 10/2009 | Lambert et al. |
| 2009/0278596 A1 | 11/2009 | Rofougaran et al. |
| 2009/0279593 A1 | 11/2009 | Rofougaran et al. |
| 2009/0285147 A1 | 11/2009 | Subasic et al. |
| 2009/0316608 A1 | 12/2009 | Singh et al. |
| 2009/0319909 A1 | 12/2009 | Hsueh et al. |
| 2010/0002626 A1 | 1/2010 | Schmidt et al. |
| 2010/0002661 A1 | 1/2010 | Schmidt et al. |
| 2010/0002662 A1 | 1/2010 | Schmidt et al. |
| 2010/0014494 A1 | 1/2010 | Schmidt et al. |
| 2010/0027443 A1 | 2/2010 | LoGalbo et al. |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0134257 A1 | 6/2010 | Puleston et al. |
| 2010/0142598 A1 | 6/2010 | Murray et al. |
| 2010/0142955 A1 | 6/2010 | Yu et al. |
| 2010/0144285 A1 | 6/2010 | Behzad et al. |
| 2010/0148373 A1 | 6/2010 | Chandrasekaran |
| 2010/0156721 A1 | 6/2010 | Alamouti et al. |
| 2010/0159859 A1 | 6/2010 | Rofougaran |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0261501 A1 | 10/2010 | Behzad et al. |
| 2010/0266287 A1 | 10/2010 | Adhikari et al. |
| 2010/0278530 A1 | 11/2010 | Kummetz et al. |
| 2010/0284323 A1 | 11/2010 | Tang et al. |
| 2010/0290355 A1 | 11/2010 | Roy et al. |
| 2010/0309049 A1 | 12/2010 | Reunamäki et al. |
| 2010/0311472 A1 | 12/2010 | Rofougaran et al. |

(56) References Cited

U.S. PATENT DOCUMENTS

| | | |
|---|---|---|
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2010/0329680 A1 | 12/2010 | Presi et al. |
| 2011/0002687 A1 | 1/2011 | Sabat, Jr. et al. |
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0019999 A1 | 1/2011 | George et al. |
| 2011/0021146 A1 | 1/2011 | Pernu |
| 2011/0021224 A1 | 1/2011 | Koskinen et al. |
| 2011/0026932 A1 | 2/2011 | Yeh et al. |
| 2011/0045767 A1 | 2/2011 | Rofougaran et al. |
| 2011/0065450 A1 | 3/2011 | Kazmi |
| 2011/0066774 A1 | 3/2011 | Rofougaran |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0116393 A1 | 5/2011 | Hong et al. |
| 2011/0116572 A1 | 5/2011 | Lee et al. |
| 2011/0122912 A1 | 5/2011 | Benjamin et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0182230 A1 | 7/2011 | Ohm et al. |
| 2011/0194475 A1 | 8/2011 | Kim et al. |
| 2011/0200328 A1 | 8/2011 | In De Betou et al. |
| 2011/0201368 A1 | 8/2011 | Faccin et al. |
| 2011/0204504 A1 | 8/2011 | Henderson et al. |
| 2011/0206383 A1 | 8/2011 | Chien et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0223958 A1 | 9/2011 | Chen et al. |
| 2011/0223960 A1 | 9/2011 | Chen et al. |
| 2011/0223961 A1 | 9/2011 | Chen et al. |
| 2011/0227795 A1 | 9/2011 | Lopez et al. |
| 2011/0243201 A1 | 10/2011 | Phillips et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0274021 A1 | 11/2011 | He et al. |
| 2011/0281536 A1 | 11/2011 | Lee et al. |
| 2012/0052892 A1 | 3/2012 | Braithwaite |
| 2012/0134666 A1 | 5/2012 | Casterline et al. |
| 2012/0177026 A1 | 7/2012 | Uyehara et al. |
| 2012/0230249 A1 | 9/2012 | Fukumoto et al. |
| 2012/0314797 A1 | 12/2012 | Kummetz et al. |
| 2013/0012195 A1 | 1/2013 | Sabat, Jr. et al. |
| 2013/0017863 A1 | 1/2013 | Kummetz et al. |
| 2013/0070816 A1 | 3/2013 | Aoki et al. |
| 2013/0071112 A1 | 3/2013 | Melester et al. |
| 2013/0089332 A1 | 4/2013 | Sauer et al. |
| 2013/0095749 A1 | 4/2013 | Kummetz |
| 2013/0095870 A1* | 4/2013 | Phillips ................ H04W 52/52 455/501 |
| 2013/0148560 A1 | 6/2013 | Yang et al. |
| 2013/0210490 A1 | 8/2013 | Fischer et al. |
| 2013/0252651 A1 | 9/2013 | Zavadsky et al. |
| 2013/0260705 A1 | 10/2013 | Stratford |
| 2014/0016583 A1 | 1/2014 | Smith |
| 2014/0024402 A1* | 1/2014 | Singh ................... H04B 17/23 455/501 |
| 2014/0140225 A1 | 5/2014 | Wala |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0219140 A1 | 8/2014 | Uyehara et al. |
| 2014/0269859 A1 | 9/2014 | Hanson et al. |
| 2014/0314061 A1 | 10/2014 | Trajkovic et al. |
| 2015/0098351 A1 | 4/2015 | Zavadsky et al. |
| 2015/0098372 A1 | 4/2015 | Zavadsky et al. |
| 2015/0098419 A1 | 4/2015 | Zavadsky et al. |
| 2015/0282105 A1* | 10/2015 | Harel ................... H04W 52/52 370/329 |
| 2016/0066331 A1 | 3/2016 | Harel |

FOREIGN PATENT DOCUMENTS

| | | |
|---|---|---|
| CA | 2065090 C | 2/1998 |
| CA | 2242707 A1 | 1/1999 |
| CN | 101389148 A | 3/2009 |
| CN | 101547447 A | 9/2009 |
| DE | 20104862 U1 | 8/2001 |
| DE | 10249414 A1 | 5/2004 |
| EP | 0477952 A2 | 4/1992 |
| EP | 0477952 A3 | 4/1992 |
| EP | 0461583 B1 | 3/1997 |
| EP | 851618 A2 | 7/1998 |
| EP | 0687400 B1 | 11/1998 |
| EP | 0993124 A2 | 4/2000 |
| EP | 1037411 A2 | 9/2000 |
| EP | 1179895 A1 | 2/2002 |
| EP | 1267447 A1 | 12/2002 |
| EP | 1347584 A2 | 9/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1530316 A1 | 5/2005 |
| EP | 1511203 B1 | 3/2006 |
| EP | 1267447 B1 | 8/2006 |
| EP | 1693974 A1 | 8/2006 |
| EP | 1742388 A1 | 1/2007 |
| EP | 1227605 B1 | 1/2008 |
| EP | 1954019 A1 | 8/2008 |
| EP | 1968250 A1 | 9/2008 |
| EP | 1056226 B1 | 4/2009 |
| EP | 1357683 B1 | 5/2009 |
| EP | 2276298 A1 | 1/2011 |
| EP | 1570626 B1 | 11/2013 |
| EP | 2925062 A1 | 9/2015 |
| GB | 2323252 A | 9/1998 |
| GB | 2370170 A | 6/2002 |
| GB | 2399963 A | 9/2004 |
| GB | 2428149 A | 1/2007 |
| JP | H4189036 A | 7/1992 |
| JP | 05260018 A | 10/1993 |
| JP | 09083450 A | 3/1997 |
| JP | 09162810 A | 6/1997 |
| JP | 09200840 A | 7/1997 |
| JP | 11068675 A | 3/1999 |
| JP | 2000152300 A | 5/2000 |
| JP | 2000341744 A | 12/2000 |
| JP | 2002264617 A | 9/2002 |
| JP | 2002353813 A | 12/2002 |
| JP | 2003148653 A | 5/2003 |
| JP | 2003172827 A | 6/2003 |
| JP | 2004172734 A | 6/2004 |
| JP | 2004245963 A | 9/2004 |
| JP | 2004247090 A | 9/2004 |
| JP | 2004264901 A | 9/2004 |
| JP | 2004265624 A | 9/2004 |
| JP | 2004317737 A | 11/2004 |
| JP | 2004349184 A | 12/2004 |
| JP | 2005018175 A | 1/2005 |
| JP | 2005087135 A | 4/2005 |
| JP | 2005134125 A | 5/2005 |
| JP | 2007228603 A | 9/2007 |
| JP | 2008172597 A | 7/2008 |
| KR | 20010055088 A | 7/2001 |
| KR | 20110087949 A | 8/2011 |
| WO | 9603823 A1 | 2/1996 |
| WO | 9748197 A2 | 12/1997 |
| WO | 9810600 A1 | 3/1998 |
| WO | 0042721 A1 | 7/2000 |
| WO | 0072475 A1 | 11/2000 |
| WO | 0178434 A1 | 10/2001 |
| WO | 0184760 A1 | 11/2001 |

(56) References Cited

FOREIGN PATENT DOCUMENTS

| | | |
|---|---|---|
| WO | 0221183 A1 | 3/2002 |
| WO | 0230141 A1 | 4/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2005062505 A1 | 7/2005 |
| WO | 2005069203 A2 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006046088 A1 | 5/2006 |
| WO | 2006051262 A1 | 5/2006 |
| WO | 2006060754 A2 | 6/2006 |
| WO | 2006077569 A1 | 7/2006 |
| WO | 2006094441 A1 | 9/2006 |
| WO | 2006105185 A2 | 10/2006 |
| WO | 2006133609 A1 | 12/2006 |
| WO | 2006136811 A1 | 12/2006 |
| WO | 2007048427 A1 | 5/2007 |
| WO | 2007075579 A2 | 7/2007 |
| WO | 2007077451 A1 | 7/2007 |
| WO | 2007088561 A1 | 8/2007 |
| WO | 2007091026 A1 | 8/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | 2008116014 A2 | 9/2008 |
| WO | 2009100395 A1 | 8/2009 |
| WO | 2009100396 A1 | 8/2009 |
| WO | 2009100397 A2 | 8/2009 |
| WO | 2009100398 A2 | 8/2009 |
| WO | 2010087919 A2 | 8/2010 |
| WO | 2010090999 A1 | 8/2010 |
| WO | 2010132739 A1 | 11/2010 |
| WO | 2011023592 A1 | 3/2011 |
| WO | 2011043172 A1 | 4/2011 |
| WO | 2011100095 A1 | 8/2011 |
| WO | 2011112373 A1 | 9/2011 |
| WO | 2011139939 A1 | 11/2011 |
| WO | 2011160117 A1 | 12/2011 |
| WO | 2012024345 A2 | 2/2012 |
| WO | 2012054553 A1 | 4/2012 |
| WO | 2012148938 A1 | 11/2012 |
| WO | 2012148940 A1 | 11/2012 |
| WO | 2012170865 A2 | 12/2012 |
| WO | 2013009835 A1 | 1/2013 |
| WO | 2013122915 A1 | 8/2013 |
| WO | 2014040608 A1 | 3/2014 |
| WO | 2014070236 A1 | 5/2014 |
| WO | 2014082070 A1 | 5/2014 |
| WO | 2014082072 A1 | 5/2014 |
| WO | 2014082075 A1 | 5/2014 |
| WO | 2014144314 A1 | 9/2014 |
| WO | 2015054162 A1 | 4/2015 |
| WO | 2015054164 A1 | 4/2015 |
| WO | 2015054165 A1 | 4/2015 |

OTHER PUBLICATIONS

Biton et al., "Challenge: CeTV and Ca-Fi—Cellular and Wi-Fi over CATV," Proceedings of the Eleventh Annual International Conference on Mobile Computing and Networking, Aug. 28-Sep. 2, 2005, Cologne, Germany, Association for Computing Machinery, 8 pages.

Non-final Office Action for U.S. Appl. No. 14/473,256 mailed Mar. 8, 2016, 16 pages.

International Search Report for PCT/IL2015/050862 mailed Dec. 3, 2015, 5 pages.

Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.

Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12, pp. 2718-2720.

Cho, Bong Youl et al. "The Forward Link Performance of a PCS System with an AGC," 4th CDMA International Conference and Exhibition, "The Realization of IMT-2000," 1999, 10 pages.

Chu, Ta-Shing et al. "Fiber optic microcellular radio", IEEE Transactions on Vehicular Technology, Aug. 1991, pp. 599-606, vol. 40, Issue 3.

Cooper, A.J., "Fiber/Radio for the Provision of Cordless/Mobile Telephony Services in the Access Network," Electronics Letters, 1990, pp. 2054-2056, vol. 26.

Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.

Dolmans, G. et al. "Performance study of an adaptive dual antenna handset for indoor communications", IEE Proceedings: Microwaves, Antennas and Propagation, Apr. 1999, pp. 138-144, vol. 146, Issue 2.

Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.

Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.

Gibson, B.C., et al., "Evanescent Field Analysis of Air-Silica Microstructure Waveguides," The 14th Annual Meeting of the IEEE Lasers and Electro-Optics Society, 1-7803-7104-4/01, Nov. 12-13, 2001, vol. 2, pp. 709-710.

Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.

Kojucharow, K., et al., "Millimeter-Wave Signal Properties Resulting from Electrooptical Upconversion," IEEE Transaction on Microwave Theory and Techniques, Oct. 2001, vol. 49, No. 10, pp. 1977-1985.

Monro, T.M., et al., "Holey Fibers with Random Cladding Distributions," Optics Letters, Feb. 15, 2000, vol. 25, No. 4, pp. 206-208.

Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.

Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.

Author Unknown, "ITU-T G.652, Telecommunication Standardization Sector of ITU, Series G: Transmission Systems and Media, Digital Systems and Networks, Transmission Media and Optical Systems Characteristics—Optical Fibre Cables, Characteristics of a Single-Mode Optical Fiber and Cable," ITU-T Recommendation G.652, International Telecommunication Union, Jun. 2005, 22 pages.

Author Unknown, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 20 pages.

Opatic, D., "Radio over Fiber Technology for Wireless Access," Ericsson, Oct. 17, 2009, 6 pages.

Paulraj, A.J., et al., "An Overview of MIMO Communications—A Key to Gigabit Wireless," Proceedings of the IEEE, Feb. 2004, vol. 92, No. 2, 34 pages.

(56) References Cited

OTHER PUBLICATIONS

Pickrell, G.R., et al., "Novel Techniques for the Fabrication of Holey Optical Fibers," Proceedings of SPIE, Oct. 28-Nov. 2, 2001, vol. 4578, 2001, pp. 271-282.
Roh, W., et al., "MIMO Channel Capacity for the Distributed Antenna Systems," Proceedings of the 56th IEEE Vehicular Technology Conference, Sep. 2002, vol. 2, pp. 706-709.
Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.
Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.
Shen, C., et al., "Comparison of Channel Capacity for MIMO-DAS versus MIMO-CAS," The 9th Asia-Pacific Conference on Communications, Sep. 21-24, 2003, vol. 1, pp. 113-118.
Wake, D. et al., "Passive Picocell: A New Concept n Wireless Network Infrastructure," Electronics Letters, Feb. 27, 1997, vol. 33, No. 5, pp. 404-406.
Windyka, John et al., "System-Level Integrated Circuit (SLIC) Technology Development for Phased Array Antenna Applications," Contractor Report 204132, National Aeronautics and Space Administration, Jul. 1997, 94 pages.
Winters, J., et al., "The Impact of Antenna Diversity on the Capacity of Wireless Communications Systems," IEEE Transcations on Communications, vol. 42, No. 2/3/4, Feb./Mar./Apr. 1994, pp. 1740-1751.
Yu et al., "A Novel Scheme to Generate Single-Sideband Millimeter-Wave Signals by Using Low-Frequency Local Oscillator Signal," IEEE Photonics Technology Letters, vol. 20, No. 7, Apr. 1, 2008, pp. 478-480.
Attygalle et al., "Extending Optical Transmission Distance in Fiber Wireless Links Using Passive Filtering in Conjunction with Optimized Modulation," Journal of Lightwave Technology, vol. 24, No. 4, Apr. 2006, 7 pages.
Bo Zhang et al., "Reconfigurable Multifunctional Operation Using Optical Injection-Locked Vertical-Cavity Surface-Emitting Lasers," Journal of Lightwave Technology, vol. 27, No. 15, Aug. 2009, 6 pages.
Chang-Hasnain, et al., "Ultrahigh-speed laser modulation by injection locking," Chapter 6, Optical Fiber Telecommunication V A: Components and Subsystems, Elsevier Inc., 2008, 20 pages.
Cheng Zhang et al., "60 GHz Millimeter-wave Generation by Two-mode Injection-locked Fabry-Perot Laser Using Second-Order Sideband Injection in Radio-over-Fiber System," Conference on Lasers and Electro-Optics and Quantum Electronics, Optical Society of America, May 2008, 2 pages.
Chrostowski, "Optical Injection Locking of Vertical Cavity Surface Emitting Lasers," Fall 2003, PhD dissertation University of California at Berkely, 122 pages.
Dang et al., "Radio-over-Fiber based architecture for seamless wireless indoor communication in the 60GHz band," Computer Communications, Elsevier B.V., Amsterdam, NL, vol. 30, Sep. 8, 2007, pp. 3598-3613.
Hyuk-Kee Sung et al., "Optical Single Sideband Modulation Using Strong Optical Injection-Locked Semiconductor Lasers," IEEE Photonics Technology Letters, vol. 19, No. 13, Jul. 1, 2007, 4 pages.
Lim et al., "Analysis of Optical Carrier-to-Sideband Ratio for Improving Transmission Performance in Fiber-Radio Links," IEEE Transactions of Microwave Theory and Techniques, vol. 54, No. 5, May 2006, 7 pages.
Lu H H et al., "Improvement of radio-on-multimode fiber systems based on light injection and optoelectronic feedback techniques," Optics Communications, vol. 266, No. 2, Elsevier B.V., Oct. 15, 2006, 4 pages.
Pleros et al., "A 60 GHz Radio-Over-Fiber Network Architecture for Seamless Communication With High Mobility," Journal of Lightwave Technology, vol. 27, No. 12, IEEE, Jun. 15, 2009, pp. 1957-1967.
Reza et al., "Degree-of-Polarization-Based PMD Monitoring for Subcarrier-Multiplexed Signals Via Equalized Carrier/Sideband Filtering," Journal of Lightwave Technology, vol. 22, No. 4, IEEE, Apr. 2004, 8 pages.
Zhao, "Optical Injection Locking on Vertical-Cavity Surface-Emitting Lasers (VCSELs): Physics and Applications," Fall 2008, PhD dissertation University of California at Berkeley, pp. 1-209.
Author Unknown, "VCSEL Chaotic Synchronization and Modulation Characteristics," Master's Thesis, Southwest Jiatong University, Professor Pan Wei, Apr. 2006, 8 pages (machine translation).
Chowdhury et al., "Multi-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.

* cited by examiner

SYSTEM-WIDE UPLINK BAND GAIN CONTROL IN A DISTRIBUTED ANTENNA SYSTEM (DAS), BASED ON PER BAND GAIN CONTROL OF REMOTE UPLINK PATHS IN REMOTE UNITS

BACKGROUND

The technology of the present disclosure relates generally to distributed antenna systems (DASs) that support distributing communications services to remote units, and particularly to per band gain control of remote uplink paths in remote units.

Wireless communication is rapidly growing, with ever-increasing demands for high-speed mobile data communication. As an example, local area wireless services (e.g., so-called "wireless fidelity" or "WiFi" systems) and wide area wireless services are being deployed in many different types of areas (e.g., coffee shops, airports, libraries, etc.). Distributed communications or antenna systems communicate with wireless devices called "clients," "client devices," or "wireless client devices," which must reside within the wireless range or "cell coverage area" in order to communicate with an access point device. Distributed antenna systems are particularly useful to be deployed inside buildings or other indoor environments where client devices may not otherwise be able to effectively receive radio-frequency (RF) signals from a source, such as a base station for example. Example applications where distributed antenna systems can be used to provide or enhance coverage for wireless services include public safety, cellular telephony, wireless local access networks (LANs), location tracking, and medical telemetry inside buildings and over campuses.

One approach to deploying a distributed antenna system involves the use of RF antenna coverage areas, also referred to as "antenna coverage areas." Antenna coverage areas can be formed by remotely distributed antenna units, also referred to as remote units (RUs). The remote units each contain or are configured to couple to one or more antennas configured to support the desired frequency(ies) or polarization to provide the antenna coverage areas. Antenna coverage areas can have a radius in the range from a few meters up to twenty meters as an example. Combining a number of remote units creates an array of antenna coverage areas. Because the antenna coverage areas each cover small areas, there typically may be only a few users (clients) per antenna coverage area. This arrangement generates a uniform high quality signal enabling high throughput supporting the required capacity for the wireless system users.

As an example, FIG. 1 illustrates distribution of communications services to coverage areas 10(1)-10(N) of a DAS 12, wherein 'N' is the number of coverage areas. These communications services can include cellular services, wireless services such as RFID tracking, Wireless Fidelity (WiFi), local area network (LAN), WLAN, and combinations thereof, as examples. The coverage areas 10(1)-10(N) may be remotely located. In this regard, the remote coverage areas 10(1)-10(N) are created by and centered on remote antenna units 14(1)-14(N) connected to a central unit 16 (e.g., a head-end controller or head-end unit). The central unit 16 may be communicatively coupled to a base station 18. In this regard, the central unit 16 receives downlink communications signals 20D from the base station 18 to be distributed to the remote antenna units 14(1)-14(N). The remote antenna units 14(1)-14(N) are configured to receive downlink communications signals 20D from the central unit 16 over a communications medium 22 to be distributed as downlink communications signals 20D to the respective coverage areas 10(1)-10(N) of the remote antenna units 14(1)-14(N). Each remote antenna unit 14(1)-14(N) may include an RF transmitter/receiver (not shown) and a respective antenna 24(1)-24(N) operably connected to the RF transmitter/receiver to wirelessly distribute the communications services to client devices 26 within their respective coverage areas 10(1)-10(N). The size of a given coverage area 10(1)-10(N) is determined by the amount of RF power transmitted by the respective remote antenna unit 14(1)-14(N), the receiver sensitivity, antenna gain and the RF environment, as well as by the RF transmitter/receiver sensitivity of the client device 26. Client devices 26 usually have a fixed RF receiver sensitivity, so that the above-mentioned properties of the remote antenna units 14(1)-14(N) mainly determine the size of their respective remote coverage areas 10(1)-10(N).

In the DAS 12 in FIG. 1, the remote antenna units 14(1)-14(N) are also configured to receive uplink communications signals 20U from the client devices 26 in their respective coverage areas 10(1)-10(N). The uplink communications signals 20U may be received in multiple frequency bands. The uplink communications signals 20U received in multiple frequency bands can be routed to different uplink path circuits (not shown) in the remote units 14(1)-14(N) related to their frequency band. At the related uplink path circuits in the remote units 14(1)-14(N), the uplink communications signals 20U can be filtered, amplified, and combined together into the combined uplink communications signals 20U to be distributed to the central unit 16. If the input power of one of the frequency bands of the received uplink communications signals 20U in a given remote unit 14 is $P_I$, the final uplink power level $P_L$ of the signal is given by $P_L = P_I + G_R + G_H$, where $G_R$ is the gain in the remote unit 14 from its antenna 24 to the signal combination point and $G_H$ is the gain in the head-end unit. In this case, $G_R + G_H$ is referred to as the end-to-end gain.

In the DAS 12 in FIG. 1, the gain $G_R$ of a remote unit 14 determines the sensitivity of the remote unit 14. Higher gain provides higher sensitivity (i.e., increased ability to decode weak uplink communications signals 20U). In this regard, each remote antenna unit 14(1)-14(N) in the DAS 12 in FIG. 1 may include automatic level controllers (ALCs) 28(1)-28(N) that limit the power level of the received incoming uplink communications signals 20U to a predetermined power level. The ALCs 28(1)-28(N) can be used in the remote antenna units 14(1)-14(N) to avoid strong incoming uplink communications signals 20U overloading the communications signal processing circuitry (e.g., an amplifier) and distorting the uplink communications signal 20U. As another example, if the DAS 12 is an optical fiber-based DAS in which the remote antenna units 14(1)-14(N) convert the uplink communications signal 20U to optical uplink signals, a strong uplink communications signal 20U could overload the laser diode (not shown) used to convert the uplink communications signal 20U to optical uplink signals.

It may be important that the combined uplink power of the combined uplink communications signals 20U remain below a combined uplink power level threshold. For example, if the DAS 12 in FIG. 1 is an optical fiber-based DAS, the signal combination point may be a laser diode to convert the combined uplink communications signals 20U to an optical signal. The laser diode enters into a non-linear region above a defined power level. Since which remote units 14(1)-14(N) may receive a high power signal is not known beforehand, the system must prepare for a worst case power level scenario where each of the remote units 14(1)-14(N) is assumed to receive a high power signal. To ensure the remote units 14(1)-14(N) can handle such a worst case power level scenario, the gain $G_R$ of the remote units 14(1)-14(N) needs to be set to a very low value in order to maintain the combined uplink power level at or below the combined power level threshold. This creates a dilemma. If the uplink power level of the combined uplink communications signals 20U of a remote unit 14 is below the combined uplink power level threshold at any given time, the gain $G_R$ of the remote unit 14 will be lower than it could otherwise be with the combined uplink power level still not exceeding the combined uplink power level threshold. Thus, the sensitivity of the remote unit 14 will be less than it could otherwise be if a lower combined uplink power level of the combined uplink communications signals 20U were assumed. However, if the gain $G_R$ of the remote unit 14 were set assuming a lower combined uplink power level of the combined uplink communications signals 20U, there will be times when the combined uplink power level of the combined uplink communications signals 20U is higher thus causing the combined uplink power level to exceed the combined uplink power level threshold for the remote unit 14.

No admission is made that any reference cited herein constitutes prior art. Applicant expressly reserves the right to challenge the accuracy and pertinency of any cited documents.

SUMMARY

Embodiments disclosed herein include system-wide uplink band gain control in a distributed antenna system (DAS) based on per-band gain control of remote uplink paths in remote units. In one embodiment, for each uplink band in the DAS, a gain control system receives remote uplink band power measurements for each remote uplink path for the uplink band. Based on these uplink band power measurements, the gain control system determines if the uplink gain of remote uplink paths in the remote units for the analyzed uplink band should be adjusted. If the uplink gain of remote uplink paths of the analyzed uplink band should be adjusted, the gain control system directs a remote uplink gain control circuit in a remote uplink path for the analyzed uplink band to adjust the uplink gain by a defined remote uplink band gain level. As a non-limiting example, this allows the initial uplink gain of the uplink band paths in the remote units to be set higher to increase sensitivity, because the gain of the uplink band paths for a given band across remote units can thereafter be reduced, if needed or desired, without reducing gain in other uplink band paths in the remote units. This is opposed to reducing the gain of all remote uplink paths in remote units equally, which would result in reduced sensitivity of all remote uplink paths in the one or more remote units.

One embodiment relates to a gain control system for providing system-wide uplink band gain control in a DAS, based on per-band gain control of remote uplink paths in remote units. The gain control system comprises a plurality of remote units. Each remote unit comprises a plurality of remote uplink band power measurement circuits each coupled to a remote uplink path among a plurality of remote uplink paths each carrying at least one uplink band communications signal in a remote unit. Each remote uplink band power measurement circuit among the plurality of remote uplink band power measurement circuits is configured to measure a remote uplink band power of an uplink band communications signal in the remote uplink path in the remote unit. Each remote uplink band power measurement circuit is also configured to provide a remote uplink band power measurement indicative of the measured remote uplink band power of the uplink band communications signal in the remote uplink path. The gain control system also comprises a central controller configured to, for each uplink band in the DAS, receive the remote uplink band power measurement for each remote uplink path for the uplink band. The central controller is also configured to determine if an uplink gain of the remote uplink paths of the plurality of remote uplink paths of the uplink band should be adjusted. If the uplink gain of the remote uplink paths of the uplink band should be adjusted, the central controller is configured to direct a remote uplink gain control circuit for each remote uplink path of the uplink band, to adjust the uplink gain of the respective remote uplink path by a defined remote uplink band gain level.

Another embodiment of the disclosure relates to a method of providing system-wide uplink band gain control in a DAS, based on per-band gain control of remote uplink paths in remote units. The method comprises, for each uplink band of a plurality of uplink bands in the DAS, receiving remote uplink band power measurements for each remote uplink path of the uplink band. The method also comprises determining if an uplink gain of the remote uplink paths of a plurality of uplink paths of the uplink band should be adjusted. If the uplink gain of the remote uplink paths of the plurality of uplink paths of the uplink band should be adjusted, the method comprises directing a remote uplink gain control circuit for each remote uplink path of the uplink band to adjust the uplink gain of the respective remote uplink path by a defined remote uplink band gain level.

Another embodiment of the disclosure relates to a non-transitory computer-readable medium having stored thereon computer executable instructions to cause a remote controller to provide system-wide uplink band gain control in a DAS, based on per-band gain control of remote uplink paths in remote units. For each uplink band of a plurality of uplink bands in the DAS, the remote controller receives remote uplink band power measurements for each remote uplink path for the uplink band. The remote controller also determines if an uplink gain of the remote uplink paths of a plurality of uplink paths of the uplink band should be adjusted. If the uplink gain of the remote uplink paths of the plurality of uplink paths of the uplink band should be adjusted, the remote controller directs a remote uplink gain control circuit for each remote uplink path of the uplink band to adjust the uplink gain of the respective remote uplink path by a defined remote uplink band gain level.

Another embodiment of the disclosure relates to a DAS. The DAS comprises a central unit configured to receive at least one downlink communications signal from a network. The central unit is also configured to distribute the received at least one downlink communications signal to a plurality of remote units. The central unit is also configured to receive a plurality of uplink communications signals from the plurality of remote units. The central unit is also configured to combine the received plurality of uplink communications signals into a combined uplink communications signal in a central uplink path. The central unit is also configured to distribute the received plurality of uplink communications signals to the network. The plurality of remote units each comprise a plurality of remote uplink band power measurement circuits each coupled to a remote uplink path among a plurality of remote uplink paths each carrying at least one uplink band communications signal in a remote unit. Each remote uplink band power measurement circuit among the plurality of remote uplink band power measurement circuits is configured to measure a remote uplink band power of an uplink band communications signal in the remote uplink path in the remote unit and provide a remote uplink band power measurement indicative of the measured remote uplink band power of the uplink band communications signal in the remote uplink path.

Each remote unit is configured to receive the at least one downlink communications signal from the central unit. Each remote unit is also configured to distribute the received at least one downlink communications signal to at least one client device. Each remote unit is also configured to receive at least one uplink communications signal among the plurality of uplink communications signals in at least one remote uplink path from the at least one client device. Each remote unit is also configured to distribute the received at least one uplink communications signal among the plurality of uplink communications signals to the central unit. For each uplink band in the DAS, the central controller is configured to receive the remote uplink band power measurement for each remote uplink path for the uplink band, determine if an uplink gain of the remote uplink paths of the plurality of remote uplink paths of the uplink band should be adjusted, and if the uplink gain of the remote uplink paths of the plurality of remote uplink paths of the uplink band should be adjusted, direct a remote uplink gain control circuit for each remote uplink path of the uplink band to adjust the uplink gain of the respective remote uplink path by a defined remote uplink band gain level.

Additional features and advantages will be set forth in the detailed description which follows, and in part, will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain the principles and operation of the various embodiments.

DETAILED DESCRIPTION

Various embodiments will be further clarified by the following examples.

Figure 1:
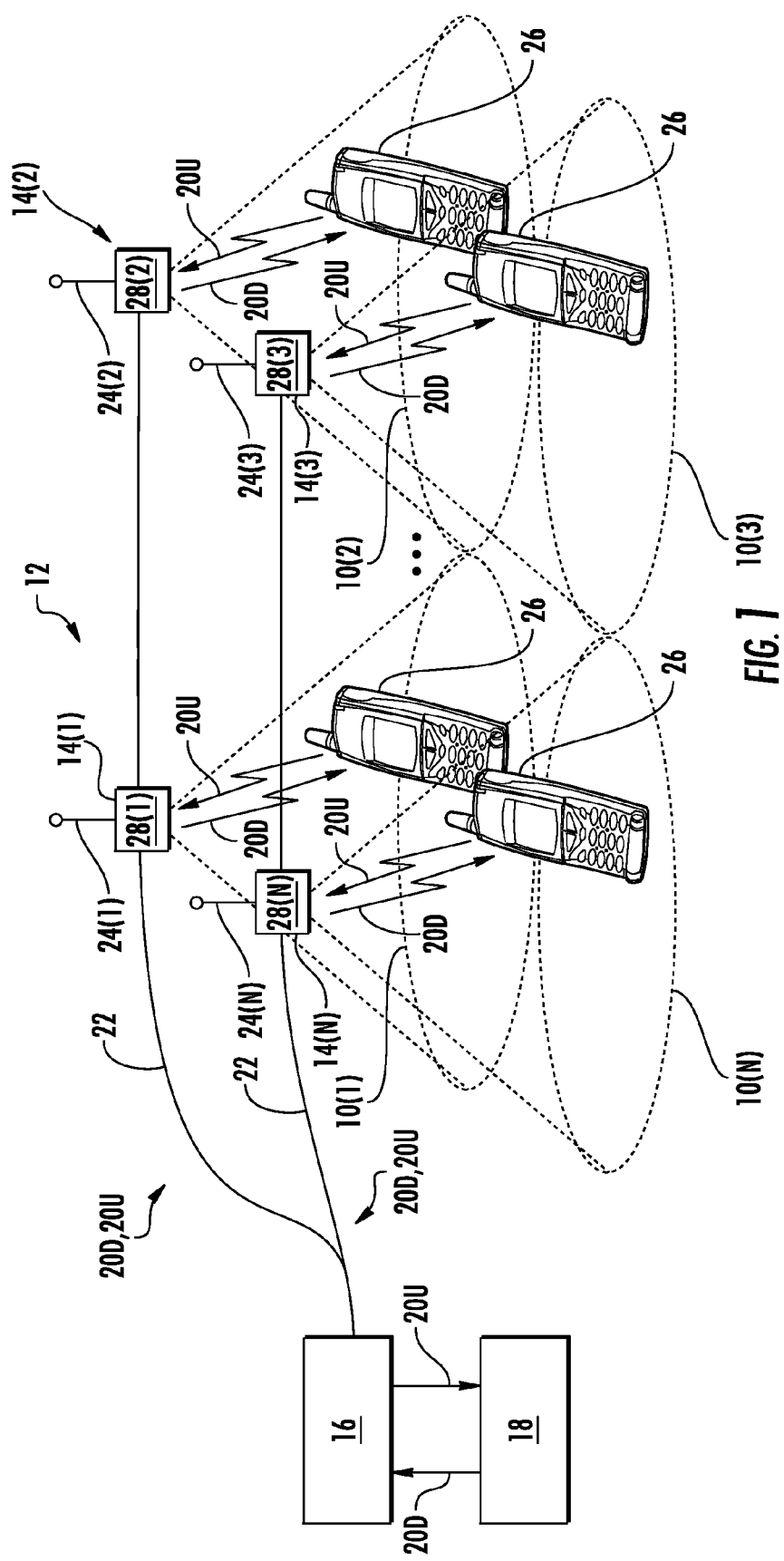
FIG. 1 is a schematic diagram of an exemplary distributed antenna system (DAS) capable of distributing radio frequency (RF) communications services to client devices.
Figure 2:
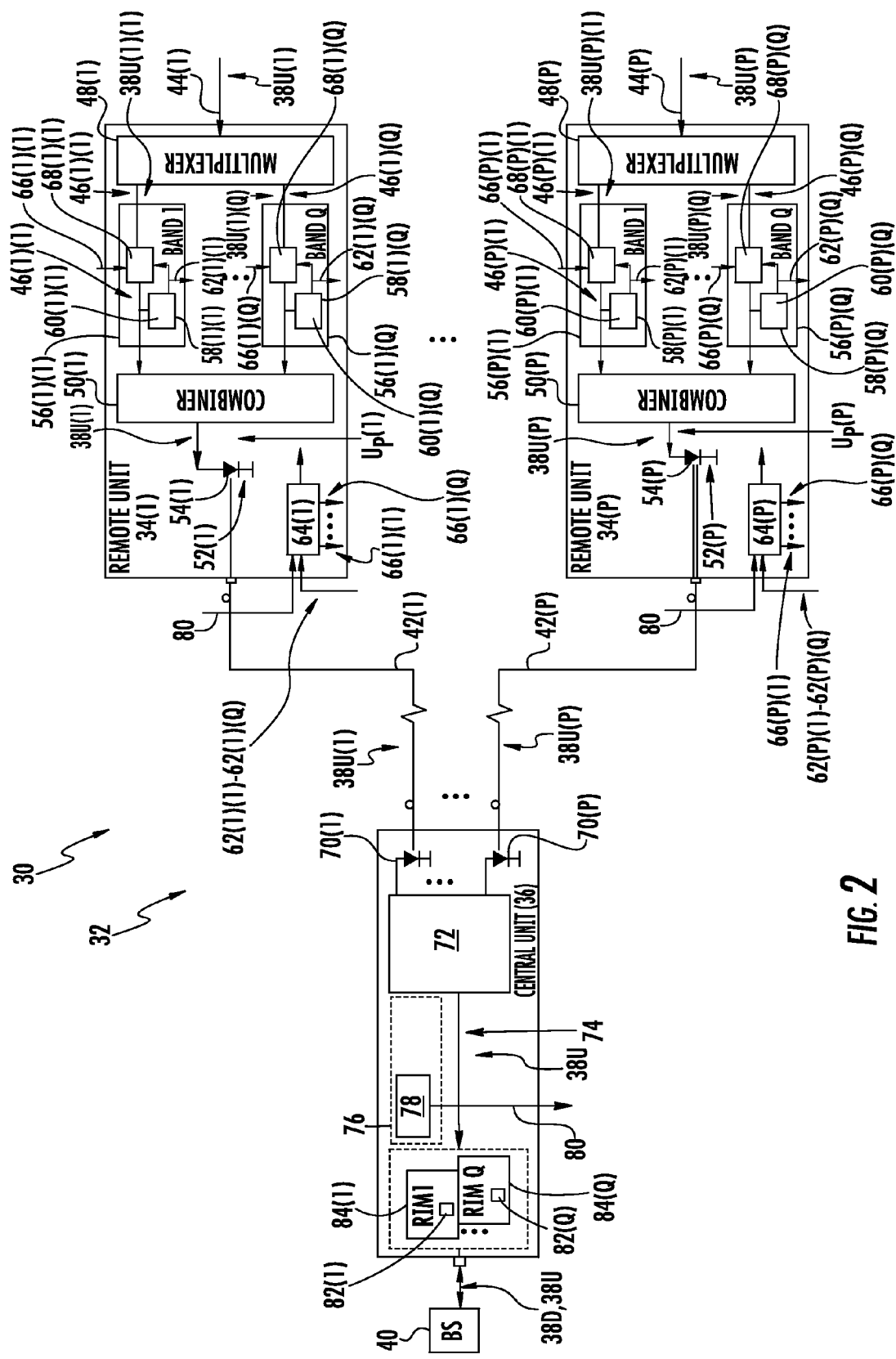
FIG. 2 is a schematic diagram of an exemplary DAS employing an exemplary gain control system for providing system-wide uplink band gain control, based on per-band gain control of remote uplink paths in remote units.

FIG. 2 is a schematic diagram of an exemplary distributed antenna system (DAS) 30. As will be discussed in more detail below, the DAS 30 employs an exemplary gain control system 32 configured to individually control the uplink path gain in remote units 34(1)-34(P) to provide system-wide uplink band gain control. Each of the remote units 34(1)-34(P) are connected to a central unit 36. The gain is adjusted for each of the uplink paths of individual remote units 34(1)-34(P) for an uplink band if the uplink gain of that uplink band should be adjusted. As will be discussed in more detail below, this allows the initial uplink gain of all remote units 34(1)-34(P) to be set higher to increase sensitivity, because the gain of each uplink band can be adjusted if needed. The gain of an uplink band that needs to be adjusted can be reduced without reducing the gain in the other remote units 34(1)-34(P) that would otherwise reduce their sensitivity. This is opposed to reducing the gain level of uplink paths in the remote units 34(1)-34(P) equally, which would result in reduced sensitivity of all the remote units 34(1)-34(P). Before discussing the gain control system 32 of the DAS 30, the components of the DAS 30 are first described below.

As shown in FIG. 2, the central unit 36 is provided. The central unit 36 is configured to receive one or more downlink communications signals 38D from a base station 40 or other network device to be distributed to the plurality of remote units 34(1)-34(P). There are 'P' number of remote units 34 provided in the DAS 30. The central unit 36 is configured to distribute the received downlink communications signals 38D over a downlink communications medium (not shown) to the remote units 34(1)-34(P) to be distributed to client devices in communication, wired and/or wirelessly, with the remote units 34(1)-34(P). The central unit 36 is also configured to receive a plurality of uplink communications signals 38U(1)-38U(P) from the plurality of remote units 34(1)-34(P) to be distributed to the base station 40. As shown in FIG. 2, in this example, separate uplink communications medium 42(1)-42(P) are provided to communicatively couple the central unit 36 to each remote unit 34(1)-34(P), respectively. The remote units 34(1)-34(P) are each configured to receive the uplink communications signals 38U(1)-38U(P) over respective antenna ports 44(1)-44(P). The uplink communications signals 38U(1)-38U(P) are distributed over one or more remote uplink paths 46(1)-46(P) in the respective remote units 34(1)-34(P).

As shown in FIG. 2, each remote unit 34(1)-34(P) includes more than one remote uplink path 46(1)(1)-46(1)(Q)-46(P)(1)-46(P)(Q), where 'Q' is the number of remote uplink paths. For example, each remote uplink path 46(1)(1)-46(1)(Q)-46(P)(1)-46(P)(Q) may be configured to support a different frequency band of the possible uplink communications signals 38U(1)-38U(P) supported by the DAS 30. These different frequency bands are referred to herein as uplink bands. A multiplexer 48(1)-48(P) provided in the remote units 34(1)-34(P) is configured to separate out the different frequency bands in the respective received uplink communications signals 38U(1)-38U(P) to direct the separate frequency bands of uplink communications signals 38U(1)-38U(P) to the correct remote uplink path 46(1)(1)-46(1)(Q)-46(P)(1)-46(P)(Q).

For example, the received uplink communications signal 38U(1) in remote unit 34(1) may be separated by the multiplexer 48(1) into uplink communications signals 38U(1)(1)-38U(1)(Q), where 'Q' is the number of frequency bands supported by the remote unit 34(1). Similarly, the received uplink communications signal 38U(P) in remote unit 34(P) may be separated by the multiplexer 48(P) into uplink communications signals 38U(P)(1)-38U(P)(Q) of 'Q' different frequency bands. The remote units 34(1)-34(P) include remote uplink combiners 50(1)-50(P). The remote uplink combiners 50(1)-50(P) are configured to combine the respective uplink communications signals 38U(1)(1)-38U(1)(Q)-38U(P)(1)-38U(P)(Q) from each remote uplink path 46(1)(1)-46(1)(Q)-46(P)(1)-46(P)(Q) in its respective remote unit 34(1)-34(P) into combined uplink communications signals 38U(1)-38U(P) to be distributed to the central unit 36.

With continuing reference to FIG. 2, in this example, the DAS 30 is an optical fiber-based DAS. In this regard, each remote unit 34(1)-34(P) has an electrical-to-optical (E-O) converter 52(1)-52(P) in the form of laser diodes 54(1)-54(P) that are configured to convert the electrical uplink communications signals 38U(1)-38U(P) into optical uplink communications signals 38U(1)-38U(P) to be distributed over optical uplink communications medium 42(1)-42(P) to the central unit 36. Because the uplink communications signals 38U(1)-38U(P) may be received by the remote units 34(1)-34(P) at power levels that could overload the laser diodes 54(1)-54(P) and thus cause non-linearity issues with E-O signal conversions, each remote uplink path 46(1)(1)-46(1)(Q)-46(P)(1)-46(P)(Q) in the remote units 34(1)-34(P) in this example includes a remote uplink gain control system 56(1)(1)-56(1)(Q)-56(P)(1)-56(P)(Q). The remote uplink gain control systems 56(1)(1)-56(1)(Q)-56(P)(1)-56(P)(Q) are configured to limit the uplink power Up(1)-Up(P) of the combined uplink communications signals 38U(1)-38U(P) applied to the laser diodes 54(1)-54(P) to respective remote uplink threshold power level.

In this regard, with continuing reference to FIG. 2, each remote uplink gain control system 56(1)(1)-56(1)(Q)-56(P)(1)-56(P)(Q) includes a remote uplink band power measurement circuit 58(1)(1)-58(1)(Q)-58(P)(1)-58(P)(Q). The remote uplink band power measurement circuits 58(1)(1)-58(1)(Q)-58(P)(1)-58(P)(Q) in this example are comprised of power detectors 60(1)(1)-60(1)(Q)-60(P)(1)-60(P)(Q) that are configured to measure power or another measurement that can be correlated to power. Each power detector 60(1)(1)-60(1)(Q)-60(P)(1)-60(P)(Q) is configured to measure a remote uplink power of the received uplink communications signals 38U(1)(1)-38U(1)(Q)-38U(P)(1)-38U(P)(Q) in the remote uplink paths 46(1)(1)-46(1)(Q)-46(P)(1)-46(P)(Q) after being attenuated by remote uplink gain control circuits 68(1)(1)-68(1)(Q)-68(P)(1)-68(P)(Q) discussed below. The power detectors 60(1)(1)-60(1)(Q)-60(P)(1)-60(P)(Q) are also configured to provide remote uplink power measurements 62(1)(1)-62(1)(Q)-62(P)(1)-62(P)(Q) indicative of the remote uplink power of the respective attenuated uplink communications signal 38U(1)(1)-38U(1)(Q)-38U(P)(1)-38U(P)(Q) in the respective remote uplink paths 46(1)(1)-46(1)(Q)-46(P)(1)-46(P)(Q) to respective remote controllers 64(1)-64(P) provided in the remote units 34(1)-34(P).

With continuing reference to FIG. 2, the remote controllers 64(1)-64(P) determine if any remote uplink gains in the respective remote uplink paths 46(1)(1)-46(1)(Q)-46(P)(1)-46(P)(Q) should be adjusted or limited based on the measured respective remote uplink power of the received uplink communications signals 38U(1)(1)-38U(1)(Q)-38U(P)(1)-38U(P)(Q). If so, the remote controllers 64(1)-64(P) are configured to issue respective remote uplink gain adjustment signals 66(1)(1)-66(1)(Q)-66(P)(1)-66(P)(Q) to respective uplink gain control circuits 68(1)(1)-68(1)(Q)-68(P)(1)-68(P)(Q) provided in the remote uplink gain control systems 56(1)(1)-56(1)(Q)-56(P)(1)-56(P)(Q). The remote uplink gain control circuits 68(1)(1)-68(1)(Q)-68(P)(1)-68(P)(Q) may be provided as automatic level controllers (ALCs) or automatic gain controllers (AGCs), as non-limiting examples. The remote uplink gain control circuits 68(1)(1)-68(1)(Q)-68(P)(1)-68(P)(Q) are disposed in the respective remote uplink paths 46(1)(1)-46(1)(Q)-46(P)(1)-46(P)(Q). The remote uplink gain control circuits 68(1)(1)-68(1)(Q)-68(P)(1)-68(P)(Q) are configured to adjust the remote uplink gain in the remote uplink paths 46(1)(1)-46(1)(Q)-46(P)(1)-46(P)(Q) based on respective received remote uplink gain adjustment signals 66(1)(1)-66(1)(Q)-66(P)(1)-66(P)(Q) from the respective remote unit controllers 64(1)-64(P). As discussed above, the remote uplink gain control circuits 68(1)(1)-68(1)(Q)-68(P)(1)-68(P)(Q) may also independently limit the remote uplink gain in the remote uplink paths 46(1)(1)-46(1)(Q)-46(P)(1)-46(P)(Q).

Note that in this example, a dedicated remote controller 64(1)-64(P) is provided in each remote unit 34(1)-34(P); the functionality of the remote controllers 64(1)-64(P) could be part of another internal controller in the respective remote units 34(1)-34(P) or a controller external to the remote units 34(1)-34(P) such as in the central unit 36.

With continuing reference to FIG. 2, as discussed above, the optical uplink communications signals 38U(1)-38U(P) are received by the central unit 36 over the uplink communications medium 42(1)-42(P). In this embodiment, the central unit 36 includes uplink optical-to-electrical (O-E) converters 70(1)-70(P) to convert the optical uplink communications signals 38U(1)-38U(P) back to electrical uplink communications signals 38U(1)-38U(P). The electrical uplink communications signals 38U(1)-38U(P) are then processed (e.g., amplified) and combined by uplink combiner 72 into a combined uplink communications signal 38U in a central uplink path 74. To provide system-wide uplink band gain control based on per-band gain control of remote uplink paths 46(1)(1)-46(1)(Q)-46(P)(1)-46(P)(Q) in remote units 34(1)-34(P), a central uplink gain control system 76 is provided in the central unit 36. The central uplink gain control system 76 includes a central controller 78 provided in the central unit 36.

With continuing reference to the DAS 30 in FIG. 2, though the remote uplink power of each received uplink communications signal 38U(1)-38U(P) in the remote units 34(1)-34(P) can be controlled by remote uplink gain control systems 56(1)(1)-56(1)(Q)-56(P)(1)-56(P)(Q) to be within desired power limits or below a remote uplink threshold power level, the central uplink gain control system 76 may determine that the uplink gain for an uplink band should be adjusted. In order to accomplish this, the remote uplink gain control systems 56(1)(1)-56(1)(Q)-56(P)(1)-56(P)(Q) in the remote units 34(1)-34(P) can be controlled by the central controller 78 in the central unit 36 to adjust the remote uplink gain of the individual uplink communications signals 38U(1)(1)-38U(1)(Q)-38U(P)(1)-38U(P)(Q) received in each remote unit 34(1)-34(P). In this embodiment, each of the remote uplink paths 46(1)(1)-46(1)(Q)-46(P)(1)-46(P)(Q) that correspond to a particular uplink band use the same index number. For example, the first uplink band is processed by remote uplink paths 46(1)(1)-46(P)(1), the second uplink band is processed by remote uplink paths 46(1)(2)-46(P)(2), and so on. While in this embodiment, each of the remote units 34(1)-34(P) includes each of the uplink bands, the DAS 30 is not limited to that arrangement. In other embodiments, each of the remote units 34(1)-34(P) may include two or more of the uplink bands as long as each uplink band supported is included in two or more of the remote units 34(1)-34(P).

In this regard, the central controller 78 in the DAS 30 in FIG. 2 can send a remote uplink gain control signal 80 to the remote controllers 64(1)-64(P) for the remote units 34(1)-34 (P). In response, the remote controllers 64(1)-64(P) can issue the remote uplink gain adjustment signals 66(1)(1)-66(1)(Q)-66(P)(1)-66(P)(Q) to respective remote uplink gain control circuits 68(1)(1)-68(1)(Q)-68(P)(1)-68(P)(Q) provided in the remote uplink gain control systems 56(1)(1)-56(1)(Q)-56(P) (1)-56(P)(Q) to adjust the remote uplink power of the individual uplink communications signals 38U(1)(1)-38U(1) (Q)-38U(P)(1)-38U(P)(Q). Thus, the gain control system 32 in the DAS 30 in FIG. 2 is configured to adjust the remote uplink gains of the remote uplink paths 46(1)(1)-46(1)(Q)-46 (P)(1)-46(P)(Q) based on the remote uplink power in the respective remote uplink paths 46(1)(1)-46(1)(Q)-46(P)(1)-46(P)(Q).

However, if the remote gain level of the remote uplink paths 46(1)(1)-46(1)(Q)-46(P)(1)-46(P)(Q) is adjusted to reduce the remote gain level, the sensitivity of the remote uplink paths 46(1)(1)-46(1)(Q)-46(P)(1)-46(P)(Q) in the remote units 34(1)-34(P) is reduced as a result. In the case where a weak uplink communications signal 38U(1)(1)-38U (1)(Q)-38U(P)(1)-38U(P)(Q) is also received at that uplink path, the power level of the weak uplink communications signal 38U(1)(1)-38U(1)(Q)-38U(P)(1)-38U(P)(Q) might go below the sensitivity threshold. In other words, weak uplink communications signal 38U(1)(1)-38U(1)(Q)-38U(P)(1)-38U(P)(Q) would be a lower power level than desired when reaching the base station 40, and as a result may not be able to be decoded within the base station 40. Therefore, this creates a dilemma in that the gain of the remote units 34(1)-34(P) should be set high for increased sensitivity and/or to allow low power level uplink communications signals 38U(1)(1)-38U(1)(Q)-38U(P)(1)-38U(P)(Q) to pass through the remote uplink paths 46(1)(1)-46(1)(Q)-46(P)(1)-46(P)(Q) of the remote units 34(1)-34(P) with high enough power to reach the base station 40, but also avoid the high power level uplink communications signals 38U(1)(1)-38U(1)(Q)-38U(P)(1)-38U(P)(Q) exceeding a threshold power level.

In this regard, in this example, the central controller 78 in the central unit 36 is configured to provide individualized gain control of remote uplink paths 46(1)(1)-46(1)(Q)-46(P) (1)-46(P)(Q) in the remote units 34(1)-34(P) to provide system-wide uplink band gain control based on per-band gain control of remote uplink paths 46(1)(1)-46(1)(Q)-46(P)(1)-46(P)(Q) in remote units 34(1)-34(P). This is opposed to reducing the remote gain level of remote uplink paths 46(1) (1)-46(1)(Q)-46(P)(1)-46(P)(Q) in the remote units 34(1)-34 (P) equally.

Figure 3:
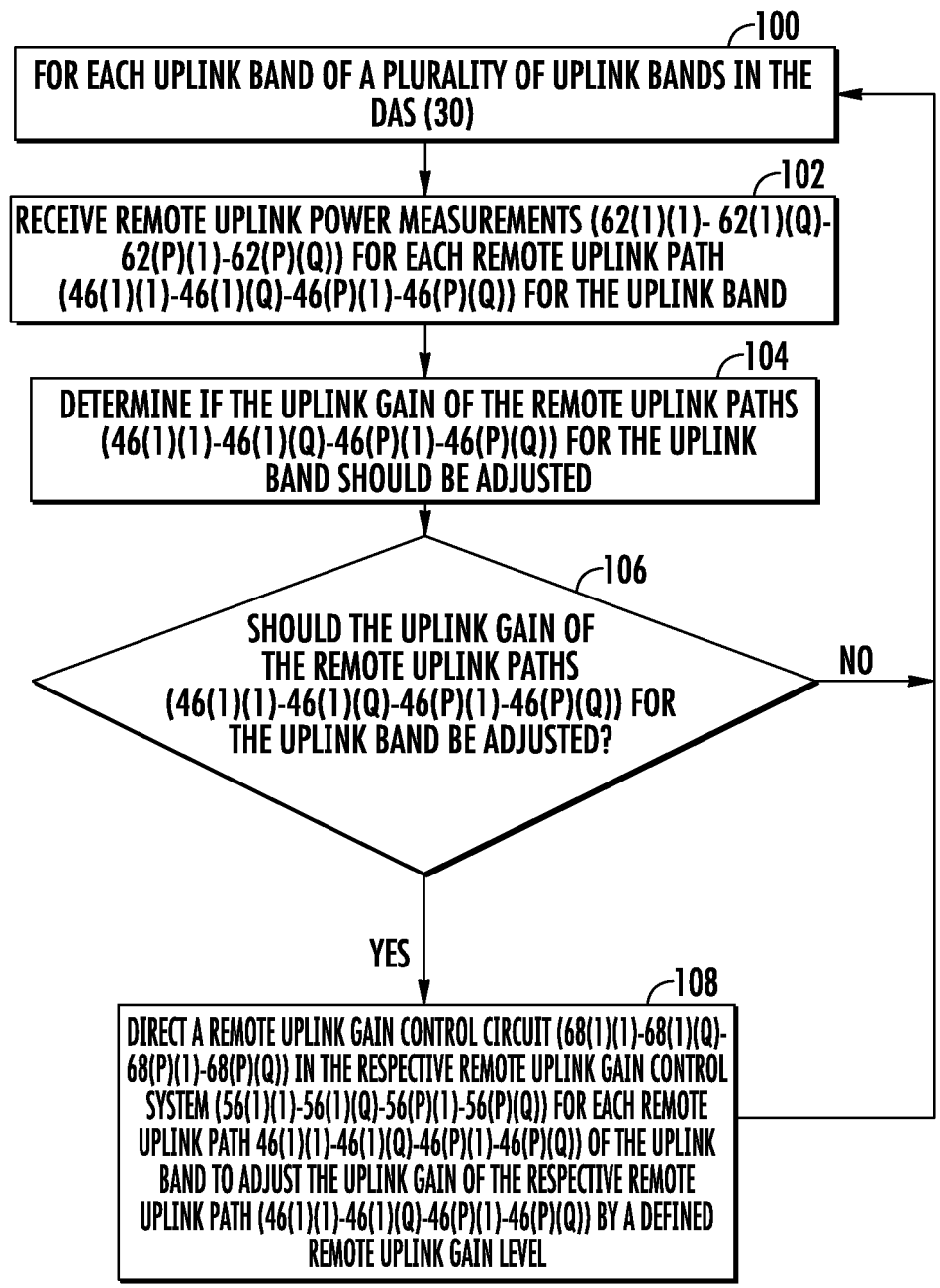
FIG. 3 is a flowchart illustrating an exemplary process of a gain control system in the DAS in FIG. 2 for providing system-wide uplink band gain control, based on per-band gain control of remote uplink paths in remote units.

In this regard, in this example, DAS 30 in FIG. 2 and as illustrated in the flowchart in FIG. 3, the central controller 78 is configured to perform the following for each uplink band of a plurality of uplink bands in the DAS 30 (block 100). The order in which the uplink bands are operated on does not matter. In some embodiments, this process may even be carried out in parallel for each uplink band at the same time. Many examples herein refer to the process as it relates to one or more specific uplink bands (such as uplink band 1). The central controller 78 is configured to receive remote uplink power measurements 62(1)(1)-62(1)(Q)-62(P)(1)-62(P)(Q) for each remote uplink path 46(1)(1)-46(1)(Q)-46(P)(1)-46 (P)(Q) for the uplink band (block 102 in FIG. 3). As discussed before, the first uplink band may be processed by remote uplink paths 46(1)(1)-46(P)(1), the second uplink band may be processed by remote uplink paths 46(1)(2)-46(P)(2), and so on. The central controller 78 is then configured to determine if the uplink gain of the remote uplink paths 46(1)(1)-46(1)(Q)-46(P)(1)-46(P)(Q) for the uplink band should be adjusted (block 104). This determination is based on the received remote uplink power measurements 62(1)(1)-62(1) (Q)-62(P)(1)-62(P)(Q) and may be made in many ways as will be discussed in more detail below. In one embodiment, the remote uplink power measurements 62(1)(1)-62(1)(Q)-62(P)(1)-62(P)(Q) are used to determine if any of the remote uplink paths 46(1)(1)-46(1)(Q)-46(P)(1)-46(P)(Q) for the uplink band are high power remote uplink paths. The central controller 78 may then determine if the uplink gain of the remote uplink paths 46(1)(1)-46(1)(Q)-46(P)(1)-46(P)(Q) for the uplink band should be increased, decreased, or not changed.

With continuing reference back to FIG. 2, if the uplink gain of the remote uplink paths 46(1)(1)-46(1)(Q)-46(P)(1)-46(P) (Q) for the uplink band should not be adjusted (block 106 in FIG. 3), the central controller 78 can repeat the process by returning back to block 100 in FIG. 3 and continuing on to another uplink band in the DAS 30. However, if the uplink gain of the remote uplink paths 46(1)(1)-46(1)(Q)-46(P)(1)-46(P)(Q) for the uplink band should not be adjusted (block 106 in FIG. 3), the central controller 78 is further configured to direct a remote uplink gain control circuit 68(1)(1)-68(1) (Q)-68(P)(1)-68(P)(Q) in the respective remote uplink gain control system 56(1)(1)-56(1)(Q)-56(P)(1)-56(P)(Q) for each remote uplink path 46(1)(1)-46(1)(Q)-46(P)(1)-46(P) (Q) of the uplink band to adjust the uplink gain of the respective remote uplink path 46(1)(1)-46(1)(Q)-46(P)(1)-46(P)(Q) by a defined remote uplink gain level (block 108 in FIG. 3). The defined remote uplink gain level may be any amount but is preferably small. In some embodiments, the defined remote uplink gain level is less than 10 dB, and in some embodiments the defined remote uplink gain level is 1 dB. The defined remote uplink gain level reduction may be set to a programmed value or calculated. Since this process may be repeated many times in some embodiments, a smaller defined remote uplink gain level will allow the system more precision in arriving at a desired uplink gain of the respective remote uplink path 46(1)(1)-46(1)(Q)-46(P)(1)-46(P)(Q). On the other hand, since the process of blocks 100 through 106 takes a certain amount of time, smaller defined remote uplink gain level will require more iterations to converge at a desired uplink gain of the respective remote uplink path 46(1)(1)-46 (1)(Q)-46(P)(1)-46(P)(Q) and will therefore take more time to complete. In some embodiments, the central controller 78 is configured to wait a specified amount of time in order to increase the accuracy of the remote uplink power measurements 62(1)(1)-62(1)(Q)-62(P)(1)-62(P)(Q). For instance, the central controller 78 may only perform the process of blocks 100 through 106 once every minute in order to decrease the chances that the uplink gain of the remote uplink paths 46(1)(1)-46(1)(Q)-46(P)(1)-46(P)(Q) is adjusted incorrectly.

Figure 4:
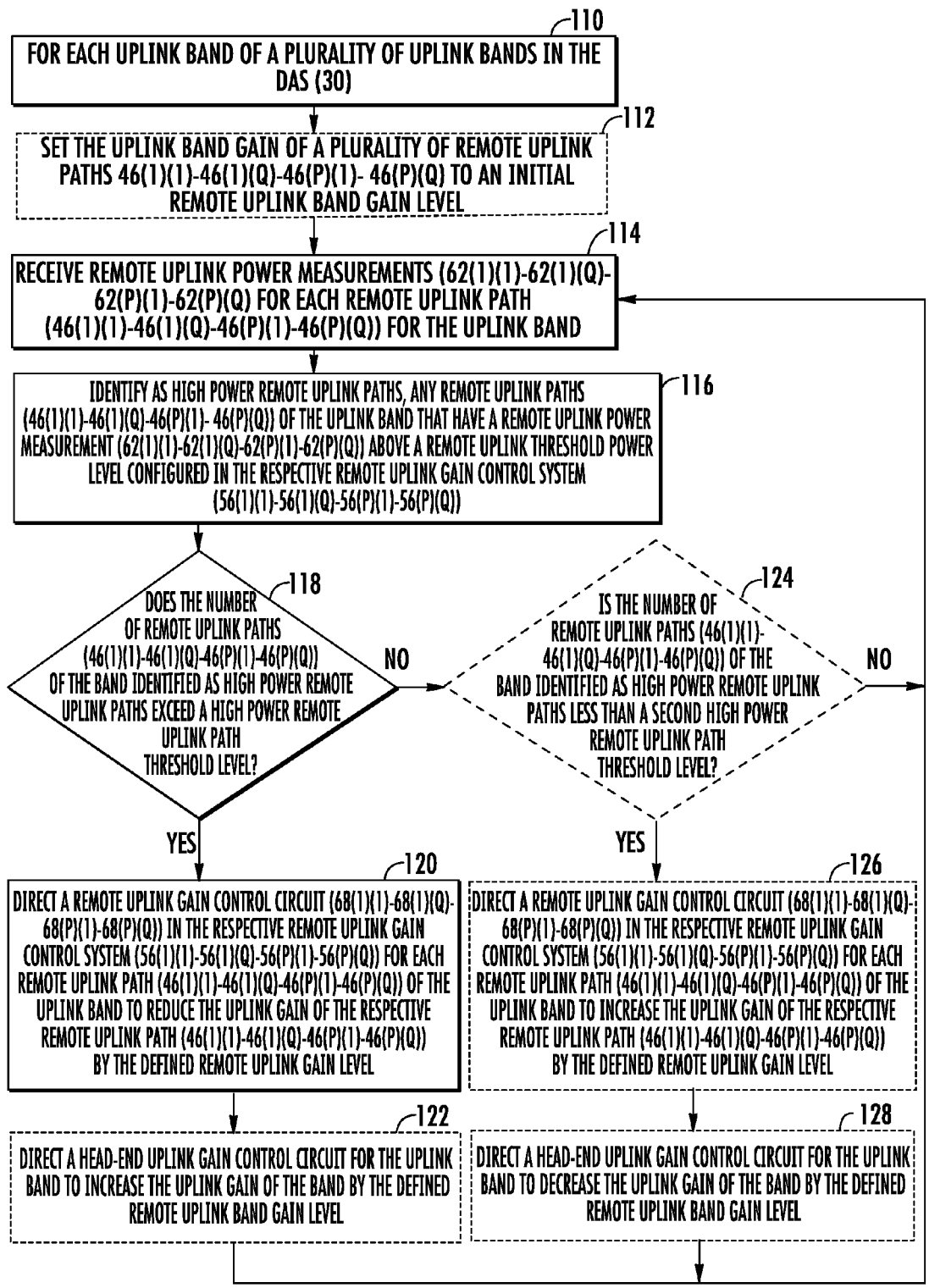
FIG. 4 is a flowchart illustrating another exemplary process of a gain control system in the DAS in FIG. 2 for providing system-wide uplink band gain control, based on per-band gain control of remote uplink paths in remote units.

FIG. 4 is a flowchart illustrating another exemplary process of a gain control system 32 in the DAS 30 in FIG. 2 for providing system-wide uplink band gain control, based on per-band gain control of remote uplink paths 46(1)(1)-46(1) (Q)-46(P)(1)-46(P)(Q) in remote units 34(1)-34(P). The central controller 78 is configured to perform the following for each uplink band of a plurality of uplink bands in the DAS 30 (block 110). In some embodiments, the central controller 78 is optionally configured to set the uplink band gain of a plurality of remote uplink paths 46(1)(1)-46(1)(Q)-46(P)(1)-46(P)(Q) to an initial remote uplink gain level (block 112).

This process may not need to be performed if an initial remote uplink gain level is already set by some other process or component. In some embodiments, the initial remote uplink gain level is set to a maximum gain level allowed in order to maximize the sensitivity of the plurality of remote uplink paths 46(1)(1)-46(1)(Q)-46(P)(1)-46(P)(Q). The central controller 78 is configured to receive remote uplink power measurements 62(1)(1)-62(1)(Q)-62(P)(1)-62(P)(Q) for each remote uplink path 46(1)(1)-46(1)(Q)-46(P)(1)-46(P)(Q) for the uplink band (block 114 in FIG. 4). Based on the received remote uplink power measurements 62(1)(1)-62(1)(Q)-62(P)(1)-62(P)(Q), the central controller 78 is configured to identify as high power remote uplink paths, any remote uplink paths 46(1)(1)-46(1)(Q)-46(P)(1)-46(P)(Q) of the uplink band that have a remote uplink power measurement 62(1)(1)-62(1)(Q)-62(P)(1)-62(P)(Q) above a remote uplink threshold power level configured in the respective remote uplink gain control system 56(1)(1)-56(1)(Q)-56(P)(1)-56(P)(Q) (block 116). The high power remote uplink paths may additionally be identified as those remote uplink paths 46(1)(1)-46(1)(Q)-46(P)(1)-46(P)(Q) within a defined power level (e.g. within 10 dB) from the respective remote uplink threshold power level. For example, the remote uplink threshold power levels for the remote uplink paths 46(1)(1)-46(1)(Q)-46(P)(1)-46(P)(Q) may be set to a single default remote uplink threshold power level used for all remote uplink paths 46(1)(1)-46(1)(Q)-46(P)(1)-46(P)(Q), or to individual default remote uplink threshold power levels specific to each of the remote uplink paths 46(1)(1)-46(1)(Q)-46(P)(1)-46(P)(1)-46(P)(Q). In embodiments where the remote uplink gain control circuits 68(1)(1)-68(1)(Q)-68(P)(1)-68(P)(Q) include ALCs, a remote uplink path 46(1)(1)-46(1)(Q)-46(P)(1)-46(P)(Q) may be identified as a high power remote uplink path if the respective ALC was activated.

With continuing reference back to FIG. 2, if the number of remote uplink paths 46(1)(1)-46(1)(Q)-46(P)(1)-46(P)(Q) of the band identified as high power remote uplink paths exceeds a high power remote uplink path threshold level (block 118), the central controller 78 determines that the uplink gain of the remote uplink paths 46(1)(1)-46(1)(Q)-46(P)(1)-46(P)(Q) for the uplink band should be decreased. This situation implies that the uplink gain of the remote uplink paths 46(1)(1)-46(1)(Q)-46(P)(1)-46(P)(Q) for the uplink band is set too high and too many of the remote uplink paths 46(1)(1)-46(1)(Q)-46(P)(1)-46(P)(Q) for the uplink band are being identified as high power remote uplink paths. Therefore, the central controller 78 is further configured to direct a remote uplink gain control circuit 68(1)(1)-68(1)(Q)-68(P)(1)-68(P)(Q) in the respective remote uplink gain control system 56(1)(1)-56(1)(Q)-56(P)(1)-56(P)(Q) for each remote uplink path 46(1)(1)-46(1)(Q)-46(P)(1)-46(P)(Q) of the uplink band to reduce the uplink gain of the respective remote uplink path 46(1)(1)-46(1)(Q)-46(P)(1)-46(P)(Q) by the defined remote uplink gain level (block 120). As discussed above, the defined remote uplink gain level may be any amount but is preferably small. In some embodiments, the defined remote uplink gain level is less than 10 dB, and in some embodiments the defined remote uplink gain level is 1 dB. The defined remote uplink gain level reduction may be set to a programmed value or calculated. The high power remote uplink path threshold level may be set to a programmed value or calculated. The high power remote uplink path threshold level also may be a number, or it may be expressed as a ratio of the number of remote uplink paths 46(1)(1)-46(1)(Q)-46(P)(1)-46(P)(Q) of the band identified as high power remote uplink paths to a total number of remote uplink paths 46(1)(1)-46(1)(Q)-46(P)(1)-46(P)(Q) of the uplink band.

In some embodiments, maintaining a predetermined end-to-end gain for an uplink path of each uplink band is desirable. The end-to-end gain is the sum of the uplink gain in the remote uplink paths 46(1)(1)-46(1)(Q)-46(P)(1)-46(P)(Q) and an uplink gain in a respective head-end uplink gain control circuit 82(1)-82(Q) for the uplink band. The head-end uplink gain control circuits 82(1)-82(Q) may be located in the central unit 36 or in another suitable location. In FIG. 2, the head-end gain control circuits 82(1)-82(Q) are included in respective radio interface modules (RIMs) 84(1)-84(Q). In order to maintain the predetermined end-to-end gain for an uplink path, after the uplink gain of the remote uplink paths 46(1)(1)-46(1)(Q)-46(P)(1)-46(P)(Q) of the uplink band is reduced by the defined remote uplink gain level (block 120 in FIG. 4), the central controller 78 is further configured to direct a head-end uplink gain control circuit 82(1)-82(Q) for the uplink band to increase the uplink gain of the band by the defined remote uplink band gain level (block 122 in FIG. 4).

With continuing reference back to FIG. 2, if the number of remote uplink paths 46(1)(1)-46(1)(Q)-46(P)(1)-46(P)(Q) of the band identified as high power remote uplink paths does not exceed the high power remote uplink path threshold level (block 118 in FIG. 4), the central controller 78 may optionally determine if there are too few remote uplink paths 46(1)(1)-46(1)(Q)-46(P)(1)-46(P)(Q) of the band identified as high power remote uplink paths. This could be an indication that the uplink gain of the remote uplink paths 46(1)(1)-46(1)(Q)-46(P)(1)-46(P)(Q) of the uplink band could be increased, thereby increasing the sensitivity of the remote uplink paths 46(1)(1)-46(1)(Q)-46(P)(1)-46(P)(Q). As such, if the number of remote uplink paths 46(1)(1)-46(1)(Q)-46(P)(1)-46(P)(Q) of the band identified as high power remote uplink paths is less than a second high power remote uplink path threshold level (block 124), the central controller 78 determines that the uplink gain of the remote uplink paths 46(1)(1)-46(1)(Q)-46(P)(1)-46(P)(Q) for the uplink band should be increased. Therefore, the central controller 78 is further configured to direct a remote uplink gain control circuit 68(1)(1)-68(1)(Q)-68(P)(1)-68(P)(Q) in the respective remote uplink gain control system 56(1)(1)-56(1)(Q)-56(P)(1)-56(P)(Q) for each remote uplink path 46(1)(1)-46(1)(Q)-46(P)(1)-46(P)(Q) of the uplink band to increase the uplink gain of the respective remote uplink path 46(1)(1)-46(1)(Q)-46(P)(1)-46(P)(Q) by the defined remote uplink gain level (block 126 in FIG. 4). The second high power remote uplink path threshold level also may be a number, or it may be expressed as a ratio of the number of remote uplink paths 46(1)(1)-46(1)(Q)-46(P)(1)-46(P)(Q) of the band identified as high power remote uplink paths to a total number of remote uplink paths 46(1)(1)-46(1)(Q)-46(P)(1)-46(P)(Q) of the uplink band.

In embodiments where maintaining a predetermined end-to-end gain for the uplink path is desirable, the central controller 78 is further configured to direct a head-end uplink gain control circuit 82(1)-82(Q) for the uplink band to decrease the uplink gain of the band by the defined remote uplink band gain level (block 128 in FIG. 4). The central controller 78 can repeat the process by returning back to block 114 in FIG. 4 and continuing on to another uplink band in the DAS 30. Also, the process may be repeated because the uplink communications signals 38U(1)(1)-38U(1)(Q)-38U(P)(1)-38U(P)(Q) received at each remote unit 34(1)-34(P) may continuously change (e.g., new calls are initiated or terminated, subscribers get closer to the DAS antennas or get away from the DAS antennas).

Figure 5:
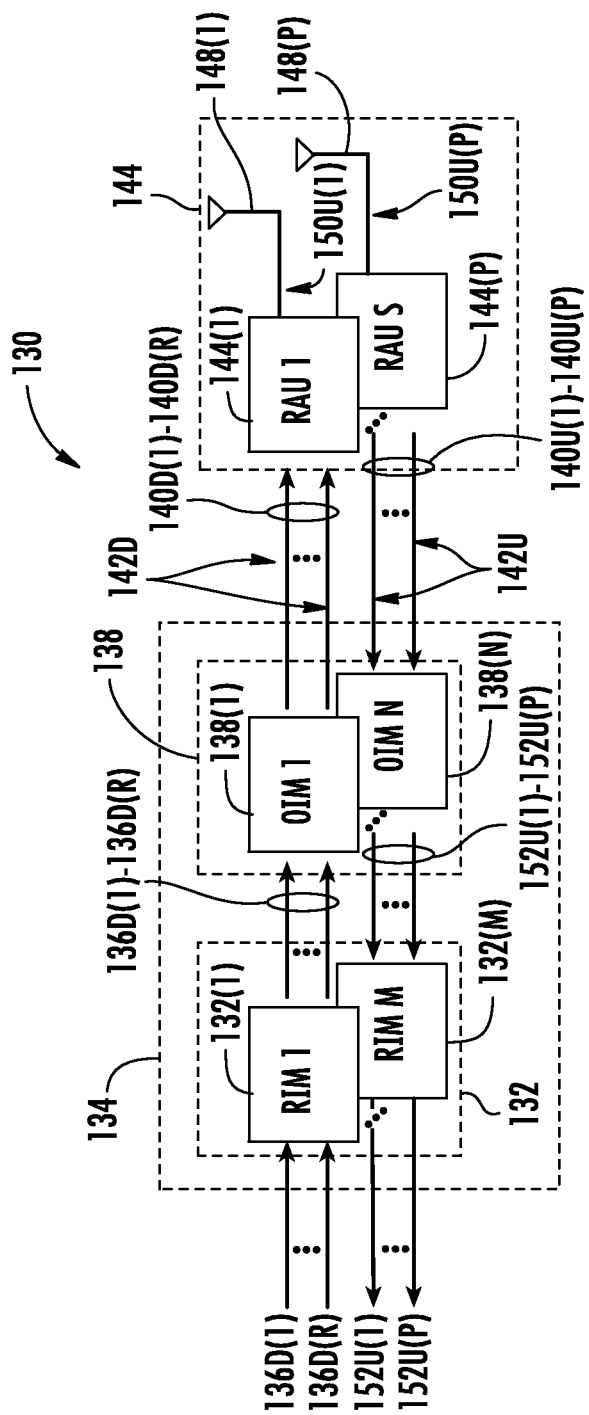
FIG. 5 is a schematic diagram of an exemplary optical fiber-based DAS that can include the gain control system in FIG. 2 for providing system-wide uplink band gain control, based on per-band gain control of remote uplink paths in remote units.

The gain control system 32 in the DAS 30 in FIG. 2 can be provided in other DASs as well, without limitation. For example, FIG. 5 is a schematic diagram of another exemplary optical fiber-based DAS 130 that may be employed according to the embodiments disclosed herein to include a gain control system, like the gain control system 32 in FIG. 2, to provide system-wide uplink band gain control based on per-band gain control. In this embodiment, the optical fiber-based DAS 130 includes optical fiber for distributing communications services. The optical fiber-based DAS 130 in this embodiment is comprised of three (3) main components. One or more radio interfaces provided in the form of radio interface modules (RIMs) 132(1)-132(M) in this embodiment are provided in a central unit 134 to receive and process downlink electrical communications signals 136D(1)-136D(R) prior to optical conversion into downlink optical communications signals. The RIMs 132(1)-132(M) provide both downlink and uplink interfaces. The notations "1-R" and "1-M" indicate that any number of the referenced component, 1-R and 1-M, respectively, may be provided. The central unit 134 is configured to accept the plurality of RIMs 132(1)-132(M) as modular components that can easily be installed and removed or replaced in the central unit 134. In one embodiment, the central unit 134 is configured to support up to twelve (12) RIMs 132(1)-132(12).

Each RIM 132(1)-132(M) can be designed to support a particular type of radio source or range of radio sources (i.e., frequencies) to provide flexibility in configuring the central unit 134 and the optical fiber-based DAS 130 to support the desired radio sources. For example, one RIM 132 may be configured to support the Personal Communication Services (PCS) radio band. Another RIM 132 may be configured to support the 700 MHz radio band. In this example, by inclusion of these RIMs 132, the central unit 134 could be configured to support and distribute communications signals on both PCS and LTE 700 radio bands, as an example. RIMs 132 may be provided in the central unit 134 that support any frequency bands desired, including but not limited to the US Cellular band, Personal Communication Services (PCS) band, Advanced Wireless Services (AWS) band, 700 MHz band, Global System for Mobile communications (GSM) 900, GSM 1800, and Universal Mobile Telecommunication System (UMTS). The RIMs 132 may also be provided in the central unit 134 that support any wireless technologies desired, including Code Division Multiple Access (CDMA), CDMA200, 1xRTT, Evolution—Data Only (EV-DO), UMTS, High-speed Packet Access (HSPA), GSM, General Packet Radio Services (GPRS), Enhanced Data GSM Environment (EDGE), Time Division Multiple Access (TDMA), Long Term Evolution (LTE), iDEN, and Cellular Digital Packet Data (CDPD).

The RIMs 132 may be provided in the central unit 134 that support any frequencies desired, including but not limited to US FCC and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink)

The downlink electrical communications signals 136D(1)-136D(R) are provided to a plurality of optical interfaces provided in the form of optical interface modules (OIMs) 138(1)-138(N) in this embodiment to convert the downlink electrical communications signals 136D(1)-136D(R) into downlink optical communications signals 140D(1)-140D(R). The notation "1-N" indicates that any number of the referenced component 1-N may be provided. The OIMs 138 may be configured to provide one or more optical interface components (OICs) that contain optical to electrical (O/E) and electrical to optical (E/O) converters, as will be described in more detail below. The OIMs 138 support the radio bands that can be provided by the RIMs 132, including the examples previously described above. Thus, in this embodiment, the OIMs 138 may support a radio band range from 400 MHz to 2700 MHz, as an example.

The OIMs 138(1)-138(N) each include E/O converters (not shown) to convert the downlink electrical communications signals 136D(1)-136D(R) into the downlink optical communications signals 140D(1)-140D(R). The downlink optical communications signals 140D(1)-140D(R) are communicated over downlink optical fiber(s) communications medium 142D to a plurality of remote antenna units 144(1)-144(P). The notation "1-P" indicates that any number of the referenced component 1-P may be provided. O/E converters (not shown) provided in the remote antenna units 144(1)-144(P) convert the downlink optical communications signals 140D(1)-140D(R) back into the downlink electrical communications signals 136D(1)-136D(R), which are provided to antennas 148(1)-148(P) in the remote antenna units 144(1)-144(P) to client devices in the reception range of the antennas 148(1)-148(P).

E/O converters (not shown) are also provided in the remote antenna units 144(1)-144(P) to convert uplink electrical communications signals 150U(1)-150U(P) received from client devices through the antennas 148(1)-148(P) into uplink optical communications signals 140U(1)-140U(P) to be communicated over an uplink optical fiber communications medium 142U to the OIMs 138(1)-138(N). The OIMs 138(1)-138(N) include O/E converters (not shown) that convert the uplink optical communications signals 140U(1)-140U(P) into uplink electrical communications signals 152U(1)-152U(P) that are processed by the RIMs 132(1)-132(M) and provided as uplink electrical communications signals 152U(1)-152U(P). Note that the downlink optical fiber communications medium 142D and uplink optical fiber communications medium 142U connected to each remote antenna unit 144(1)-144(P) may be a common optical fiber communications medium, wherein for example, wave division multiplexing (WDM) may be employed to provide the downlink optical communications signals 140D(1)-140D(R) and the uplink optical communications signals 140U(1)-140U(P) on the same optical fiber communications medium.

Figure 6:
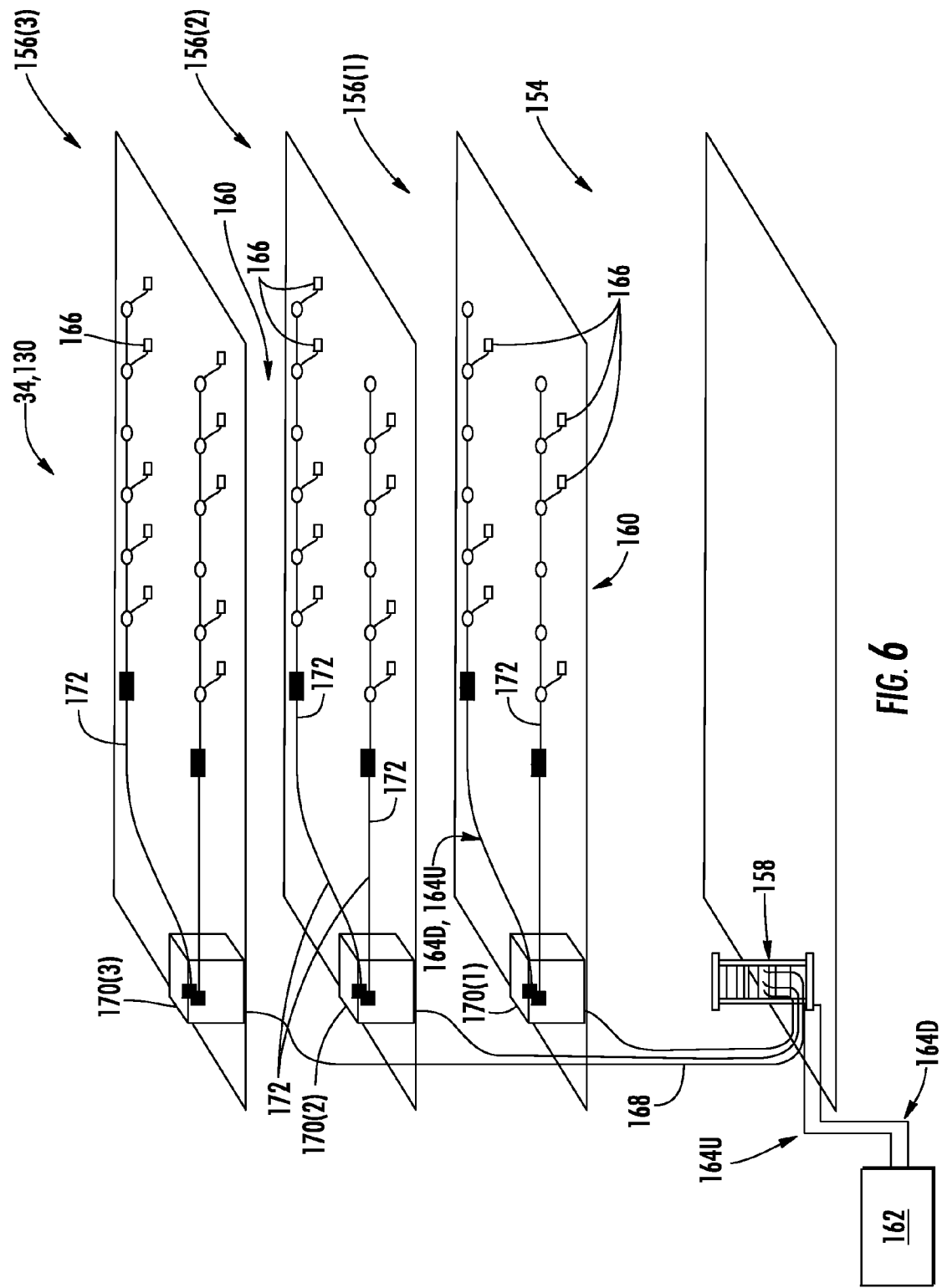
FIG. 6 is a partially schematic cut-away diagram of an exemplary building infrastructure in which the DAS in FIG. 5 can be employed.

The DAS 130 in FIG. 5 may also be provided in an indoor environment, as illustrated in FIG. 6. FIG. 6 is a partially schematic cut-away diagram of a building infrastructure 154 employing the DASs 30, 130 described herein. The building infrastructure 154 in this embodiment includes a first (ground) floor 156(1), a second floor 156(2), and a third floor 156(3). The floors 156(1)-156(3) are serviced by the central unit 158 to provide the antenna coverage areas 160 in the building infrastructure 154. The central unit 158 is communicatively coupled to the base station 162 to receive downlink communications signals 164D from the base station 162. The central unit 158 is communicatively coupled to the remote antenna units 166 to receive the uplink communications signals 164U from the remote antenna units 166, as previously discussed above. The downlink and uplink communications signals 164D, 164U communicated between the central unit 158 and the remote antenna units 166 are carried over a riser cable 168. The riser cable 168 may be routed through interconnect units (ICUs) 170(1)-170(3) dedicated to each floor 156(1)-156(3) that route the downlink and uplink communications signals 164D, 164U to the remote antenna units 166 and also provide power to the remote antenna units 166 via array cables 172.

Figure 7:
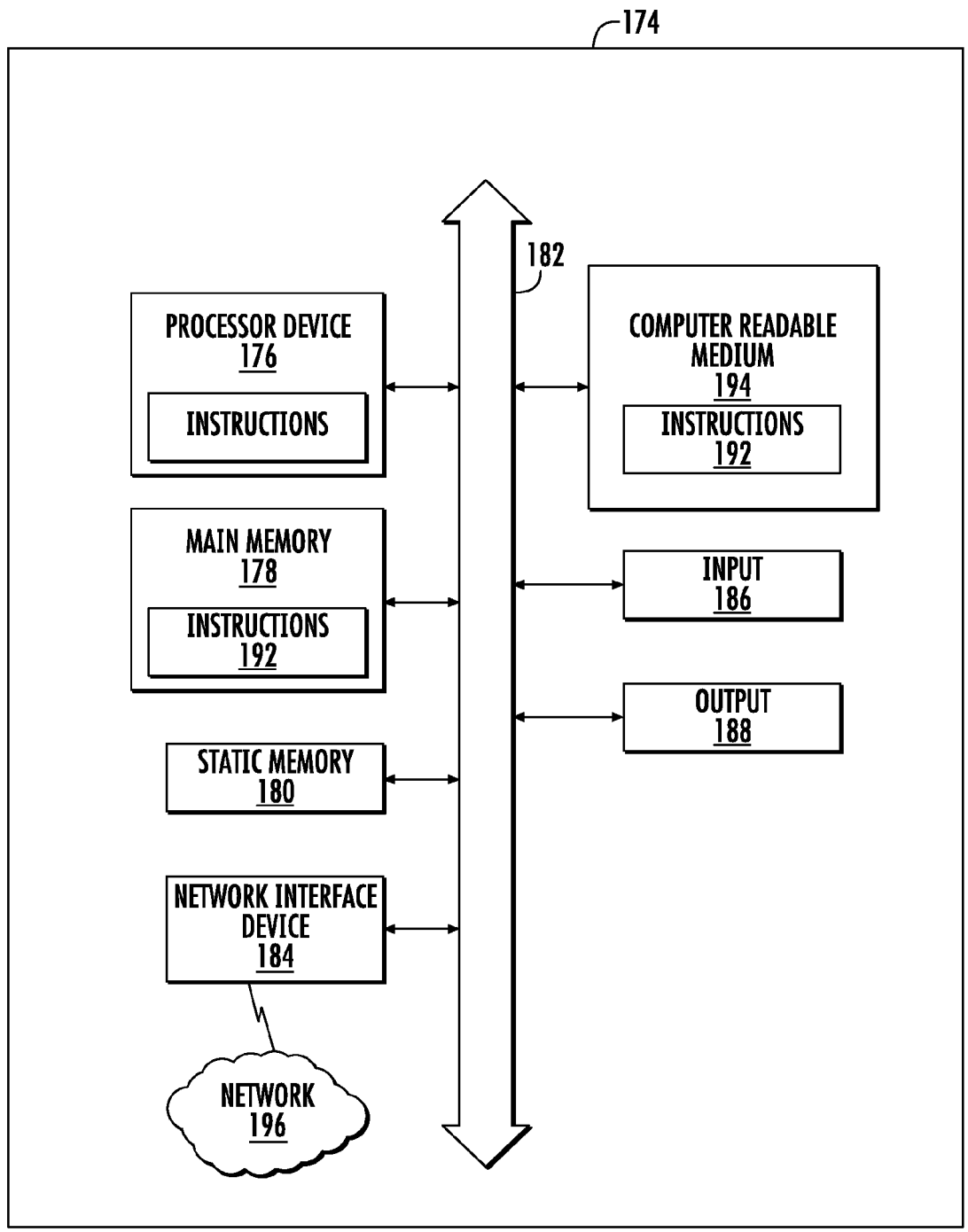
FIG. 7 is a schematic diagram of a generalized representation of an exemplary controller that can be included in any central units, remote units, wireless client devices, and/or any other components of a DAS to individually control the uplink band path gain in remote units, wherein the exemplary computer system is adapted to execute instructions from an exemplary computer readable medium.

FIG. 7 is a schematic diagram representation of additional detail illustrating a computer system 174 that could be employed in any controllers disclosed herein, including the central controller 78 and the remote controllers 64(1)-64(P) in the DAS 30 in FIG. 2. The computer system 174 is adapted to execute instructions from an exemplary computer-readable medium to perform these and/or any of the functions or processing described herein.

In this regard, the computer system 174 in FIG. 7 may include a set of instructions that may be executed to calculate gain of DAS segments in a DAS. The computer system 174 may be connected (e.g., networked) to other machines in a LAN, an intranet, an extranet, or the Internet. While only a single device is illustrated, the term "device" shall also be taken to include any collection of devices that individually or jointly execute a set (or multiple sets) of instructions to perform any one or more of the methodologies discussed herein. The computer system 174 may be a circuit or circuits included in an electronic board card, such as, a printed circuit board (PCB), a server, a personal computer, a desktop computer, a laptop computer, a personal digital assistant (PDA), a computing pad, a mobile device, or any other device, and may represent, for example, a server or a user's computer.

The exemplary computer system 174 in this embodiment includes a processing device or processor 176, a main memory 178 (e.g., read-only memory (ROM), flash memory, dynamic random access memory (DRAM), such as synchronous DRAM (SDRAM), etc.), and a static memory 180 (e.g., flash memory, static random access memory (SRAM), etc.), which may communicate with each other via a data bus 182. Alternatively, the processor 176 may be connected to the main memory 178 and/or static memory 180 directly or via some other connectivity means. The processor 176 may be a controller, and the main memory 178 or static memory 180 may be any type of memory.

The processor 176 represents one or more general-purpose processing devices, such as a microprocessor, central processing unit, or the like. More particularly, the processor 176 may be a complex instruction set computing (CISC) microprocessor, a reduced instruction set computing (RISC) microprocessor, a very long instruction word (VLIW) microprocessor, a processor implementing other instruction sets, or other processors implementing a combination of instruction sets. The processor 176 is configured to execute processing logic in instructions for performing the operations and steps discussed herein.

The computer system 174 may further include a network interface device 184. The computer system 174 also may or may not include an input 186, configured to receive input and selections to be communicated to the computer system 174 when executing instructions. The computer system 174 also may or may not include an output 188, including but not limited to a display, a video display unit (e.g., a liquid crystal display (LCD) or a cathode ray tube (CRT)), an alphanumeric input device (e.g., a keyboard), and/or a cursor control device (e.g., a mouse). The computer system 174 may or may not include a data storage device that includes instructions 192 stored in a computer-readable medium 194. The instructions 192 may also reside, completely or at least partially, within the main memory 178 and/or within the processor 176 during execution thereof by the computer system 174, the main memory 178, and the processor 176 also constituting computer-readable medium. The instructions 192 may further be transmitted or received over a network 192 via the network interface device 184.

While the computer-readable medium 194 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the processing device and that cause the processing device to perform any one or more of the methodologies of the embodiments disclosed herein. The term "computer-readable medium" shall accordingly be taken to include, but not be limited to, solid-state memories, optical medium, and magnetic medium.

The embodiments disclosed herein include various steps. The steps of the embodiments disclosed herein may be formed by hardware components or may be embodied in machine-executable instructions, which may be used to cause a general-purpose or special-purpose processor programmed with the instructions to perform the steps. Alternatively, the steps may be performed by a combination of hardware and software.

The embodiments disclosed herein may be provided as a computer program product, or software, that may include a machine-readable medium (or computer-readable medium) having stored thereon instructions, which may be used to program a computer system (or other electronic devices) to perform a process according to the embodiments disclosed herein. A machine-readable medium includes any mechanism for storing or transmitting information in a form readable by a machine (e.g., a computer). For example, a machine-readable medium includes: a machine-readable storage medium (e.g., ROM, random access memory ("RAM"), a magnetic disk storage medium, an optical storage medium, flash memory devices, etc.); and the like.

Unless specifically stated otherwise and as apparent from the previous discussion, it is appreciated that throughout the description, discussions utilizing terms such as "processing," "computing," "determining," "displaying," or the like, refer to the action and processes of a computer system, or similar electronic computing device, that manipulates and transforms data and memories represented as physical (electronic) quantities within the computer system's registers into other data similarly represented as physical quantities within the computer system memories or registers or other such information storage, transmission, or display devices.

The algorithms and displays presented herein are not inherently related to any particular computer or other apparatus. Various systems may be used with programs in accordance with the teachings herein, or it may prove convenient to construct more specialized apparatuses to perform the required method steps. The required structure for a variety of these systems will appear from the description above. In addition, the embodiments described herein are not described with reference to any particular programming language. It will be appreciated that a variety of programming languages may be used to implement the teachings of the embodiments as described herein.

Those of skill in the art will further appreciate that the various illustrative logical blocks, modules, circuits, and algorithms described in connection with the embodiments disclosed herein may be implemented as electronic hardware, instructions stored in memory or in another computer-readable medium and executed by a processor or other processing device, or combinations of both. The components of the distributed antenna systems described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends on the particular application, design choices, and/or design constraints imposed on the overall system. Skilled artisans may implement the described functionality in varying ways for each particular application, but such implementation decisions should not be interpreted as causing a departure from the scope of the present embodiments.

The various illustrative logical blocks, modules, and circuits described in connection with the embodiments disclosed herein may be implemented or performed with a processor, a Digital Signal Processor (DSP), an Application Specific Integrated Circuit (ASIC), a Field Programmable Gate Array (FPGA), or other programmable logic device, a discrete gate or transistor logic, discrete hardware components, or any combination thereof designed to perform the functions described herein. Furthermore, a controller may be a processor. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The embodiments disclosed herein may be embodied in hardware and in instructions that are stored in hardware, and may reside, for example, in RAM, flash memory, ROM, Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

The operational steps described in any of the exemplary embodiments herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary embodiments may be combined. Those of skill in the art will also understand that information and signals may be represented using any of a variety of technologies and techniques. For example, data, instructions, commands, information, signals, bits, symbols, and chips, that may be references throughout the above description, may be represented by voltages, currents, electromagnetic waves, magnetic fields, or particles, optical fields or particles, or any combination thereof.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

Various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. A gain control system for providing system-wide uplink band gain control in a distributed antenna system (DAS), based on per-band gain control of remote uplink paths in remote units, comprising:
   a plurality of remote units, each comprising:
      a plurality of remote uplink band power measurement circuits each coupled to a remote uplink path among a plurality of remote uplink paths each carrying at least one uplink band communications signal in a remote unit, each remote uplink band power measurement circuit among the plurality of remote uplink band power measurement circuits configured to:
         measure a remote uplink band power of an uplink band communications signal in the remote uplink path in the remote unit; and
         provide a remote uplink band power measurement indicative of the measured remote uplink band power of the uplink band communications signal in the remote uplink path; and
   a central controller configured to, for each uplink band in the DAS:
      (i) receive the remote uplink band power measurement for each remote uplink path for the uplink band;
      (ii) determine if an uplink gain of the remote uplink paths of the plurality of remote uplink paths of the uplink band should be adjusted; and
      (iii) if the uplink gain of the remote uplink paths of the uplink band should be adjusted:
         direct a remote uplink gain control circuit for each remote uplink path of the uplink band, to adjust the uplink gain of the respective remote uplink path by a defined remote uplink band gain level,
   wherein the central controller is configured to determine if the uplink gain of the remote uplink paths of the plurality of remote uplink paths of the uplink band should be adjusted by being configured to:
   (a) identify as high power remote uplink paths any remote uplink paths of the plurality of remote uplink paths of the uplink band that have a remote uplink band power measurement above a remote uplink threshold power level; and
   (b) if a number of remote uplink paths of the plurality of remote uplink paths of the uplink band identified as high power remote uplink paths exceeds a high power remote uplink path threshold level:
      direct the remote uplink gain control circuit for each remote uplink path of the uplink band to reduce the uplink gain of the respective remote uplink path by the defined remote uplink band gain level.

2. The gain control system of claim 1, further comprising a central unit comprising:
the central controller;
a plurality of head-end uplink paths each carrying at least one uplink band communications signal; and
a plurality of head-end uplink gain control circuits each coupled to a corresponding head-end uplink path, wherein:
the central controller is further configured to:
(c) if the number of remote uplink paths of the plurality of remote uplink paths of the uplink band identified as high power remote uplink paths exceeds the high power remote uplink path threshold level:
direct a head-end uplink gain control circuit corresponding to the head-end uplink path for the uplink band to increase the uplink gain of the corresponding head-end uplink path for the uplink band by the defined remote uplink band gain level.

3. The gain control system of claim 2, wherein each head-end uplink gain control circuit among the plurality of head-end uplink gain control circuits is included in a radio interface module (RIM) for the corresponding uplink band.

4. The gain control system of claim 2, wherein the central controller is configured to:
if a number of remote uplink paths of the plurality of remote uplink paths of the uplink band that were identified as high power remote uplink paths is less than the second high power remote uplink path threshold level:
direct a head-end uplink gain control circuit for the uplink band to reduce the uplink gain of the uplink band by the defined remote uplink band gain level.

5. The gain control system of claim 1, wherein the high power remote uplink path threshold level is comprised of a ratio of a number of remote uplink paths of the uplink band identified as high power remote uplink paths to a total number of remote uplink paths of the plurality of uplink paths of the uplink band.

6. The gain control system of claim 1, wherein:
each remote uplink gain control circuit comprises a remote uplink automatic level control (ALC) circuit further configured to limit a remote uplink power level of the remote uplink path based on a remote uplink gain adjustment signal received from the central controller; and
the central controller is configured to identify as high power remote uplink paths any remote uplink paths of the plurality of remote uplink paths of the uplink band that have activated the remote uplink ALC circuit.

7. The gain control system of claim 1, wherein the defined remote uplink band gain level is lower than 10 dB.

8. The gain control system of claim 1, wherein the defined remote uplink band gain level is approximately 1 dB.

9. The gain control system of claim 1, further comprising the central controller repeatedly performing tasks (i)-(iii).

10. The gain control system of claim 1, wherein the central controller is further configured to set the uplink gain of the plurality of remote uplink paths to an initial remote uplink band gain level before performing tasks (i)-(iii).

11. The gain control system of claim 10, wherein the initial remote uplink band gain level is comprised of a maximum remote uplink band gain level, and wherein the maximum remote uplink band gain level is in the range of 10 dB to 30 dB.

12. The gain control system of claim 1, wherein each remote unit is configured to receive optical downlink communications signals and to transmit RF communications to a coverage area.

13. A gain control system for providing system-wide uplink band gain control in a distributed antenna system (DAS), based on per-band gain control of remote uplink paths in remote units, comprising:
a plurality of remote units, each comprising:
a plurality of remote uplink band power measurement circuits each coupled to a remote uplink path among a plurality of remote uplink paths each carrying at least one uplink band communications signal in a remote unit, each remote uplink band power measurement circuit among the plurality of remote uplink band power measurement circuits configured to:
measure a remote uplink band power of an uplink band communications signal in the remote uplink path in the remote unit; and
provide a remote uplink band power measurement indicative of the measured remote uplink band power of the uplink band communications signal in the remote uplink path; and
a central controller configured to, for each uplink band in the DAS:
receive the remote uplink band power measurement for each remote uplink path for the uplink band;
(ii) determine if an uplink gain of the remote uplink paths of the plurality of remote uplink paths of the uplink band should be adjusted; and
(iii) if the uplink gain of the remote uplink paths of the uplink band should be adjusted:
direct a remote uplink gain control circuit for each remote uplink path of the uplink band, to adjust the uplink gain of the respective remote uplink path by a defined remote uplink band gain level,
wherein the central controller is configured to determine if the uplink gain of the remote uplink paths of the plurality of remote uplink paths of the uplink band should be adjusted by being configured to:
(a) identify as high power remote uplink paths, any remote uplink paths of the plurality of remote uplink paths of the uplink band that have a remote uplink band power measurement above a remote uplink threshold power level; and
(b) if the number of remote uplink paths of the plurality of remote uplink paths of the uplink band identified as high power remote uplink paths is less than a second high power remote uplink path threshold level:
direct the remote uplink gain control circuit for each remote uplink path of the uplink band to increase the uplink gain of the respective remote uplink path by the defined remote uplink band gain level.

14. The gain control system of claim 13, wherein each remote unit is configured to receive optical downlink communications signals and to transmit RF communications to a coverage area.

15. A method of providing system-wide uplink band gain control in a distributed antenna system (DAS), based on per-band gain control of remote uplink paths in remote units, comprising:
for each uplink band of a plurality of uplink bands in the DAS:
(i) receiving remote uplink band power measurements for each remote uplink path of the uplink band;

(ii) determining if an uplink gain of the remote uplink paths of a plurality of remote uplink paths of the uplink band should be adjusted; and (iii) if the uplink gain of the remote uplink paths of the plurality of remote uplink paths of the uplink band should be adjusted:

directing a remote uplink gain control circuit for each remote uplink path of the uplink band to adjust the uplink gain of the respective remote uplink path by a defined remote uplink band gain level, wherein determining if the uplink gain of the remote uplink paths of the plurality of remote uplink paths of the uplink band should be adjusted comprises:

(a) identifying as high power remote uplink paths any remote uplink paths of the plurality of remote uplink paths of the uplink band that have a remote uplink band power measurement above a remote uplink threshold power level; and (b) if the number of remote uplink paths of the uplink band identified as high power remote uplink paths exceeds a high power remote uplink path threshold level:

directing the remote uplink gain control circuit for each remote uplink path of the uplink band to reduce the uplink gain of the respective remote uplink path by the defined remote uplink band gain level.

16. The method of claim 15, further comprising repeatedly performing tasks (i)-(iii).

17. The method of claim 15, wherein each remote unit is configured to receive optical downlink communications signals and to transmit RF communications to a coverage area.

18. A method of providing system-wide uplink band gain control in a distributed antenna system (DAS), based on per-band gain control of remote uplink paths in remote units, comprising:

for each uplink band of a plurality of uplink bands in the DAS:

(i) receiving remote uplink band power measurements for each remote uplink path of the uplink band;

(ii) determining if an uplink gain of the remote uplink paths of a plurality of remote uplink paths of the uplink band should be adjusted; and (iii) if the uplink gain of the remote uplink paths of the plurality of remote uplink paths of the uplink band should be adjusted:

directing a remote uplink gain control circuit for each remote uplink path of the uplink band to adjust the uplink gain of the respective remote uplink path by a defined remote uplink band gain level, wherein determining if the uplink gain of the remote uplink paths of the plurality of remote uplink paths of the uplink band should be adjusted comprises:

(a) identifying as high power remote uplink paths, any remote uplink paths of the plurality of remote uplink paths of the uplink band that have a remote uplink band power measurement above a remote uplink threshold power level; and (b) if the number of remote uplink paths of the uplink band identified as high power remote uplink paths is less than a second high power remote uplink path threshold level:

directing the remote uplink gain control circuit for each remote uplink path of the uplink band to increase the uplink gain of the respective remote uplink path by the defined remote uplink band gain level.

19. The method of claim 18, further comprising repeatedly performing tasks (i)-(iii).

20. The method of claim 18, wherein each remote unit is configured to receive optical downlink communications signals and to transmit RF communications to a coverage area.

* * * * *